(12) United States Patent
Herman et al.

(10) Patent No.: US 10,823,059 B2
(45) Date of Patent: Nov. 3, 2020

(54) ACOUSTIC CORE ASSEMBLIES WITH MECHANICALLY JOINED ACOUSTIC CORE SEGMENTS, AND METHODS OF MECHANICALLY JOINING ACOUSTIC CORE SEGMENTS

(71) Applicant: General Electric Company, Schenectady, NY (US)

(72) Inventors: David Michael Herman, Beavercreek, OH (US); Wendy Wenling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/150,448

(22) Filed: Oct. 3, 2018

(65) Prior Publication Data

US 2020/0109664 A1    Apr. 9, 2020

(51) Int. Cl.
*F02C 7/045* (2006.01)
*G10K 11/172* (2006.01)
(Continued)

(52) U.S. Cl.
CPC ............... *F02C 7/045* (2013.01); *B32B 3/12* (2013.01); *G10K 11/172* (2013.01);
(Continued)

(58) Field of Classification Search
CPC . B32B 2307/102; B32B 3/12; F05D 2240/14; F05D 2260/30; F05D 2260/96;
(Continued)

(56) References Cited

U.S. PATENT DOCUMENTS 3,035,657 A   5/1962  Lemon
3,070,198 A   12/1962 Haskell
(Continued)

FOREIGN PATENT DOCUMENTS

EP    0405581 B1    10/1993
EP    0839101 B1    5/1998
(Continued)

OTHER PUBLICATIONS

U.S. Appl. No. 15/421,935, filed Feb. 1, 2017.
(Continued)

*Primary Examiner* — Forrest M Phillips
(74) *Attorney, Agent, or Firm* — Dority & Manning, P.A.

(57) ABSTRACT

Acoustic core segments include splicing resonant cells that resemble a first segment of a whole resonant cell configured to overlap and align with counterpart splicing resonant cells of another acoustic core segment so as to define a splice joint. The splicing resonant cells include one or more fastening elements configured to couple with corresponding counterpart splicing resonant cells thereby together defining coupled resonant cells. Acoustic liners have an acoustic core assembly that includes a first acoustic core segment mechanically joined with a second acoustic core segment by a combination of splicing resonant cells of the first acoustic core segment overlapping and aligning with splicing resonant cells of the second acoustic core segment so as to define a splice joint, and a plurality of fastening elements coupling splicing resonant cells of the first acoustic core segment with splicing resonant cells of the second acoustic core segment.

20 Claims, 19 Drawing Sheets

(51) Int. Cl.
*B32B 3/12* (2006.01)
*F02K 1/82* (2006.01)

(52) U.S. Cl.
CPC ......... *B32B 2307/102* (2013.01); *F02K 1/827* (2013.01); *F05D 2230/51* (2013.01); *F05D 2240/14* (2013.01); *F05D 2260/30* (2013.01); *F05D 2260/96* (2013.01)

(58) Field of Classification Search
CPC ... F05D 2230/51; F02C 7/045; G10K 11/172; F02K 1/827
USPC .......................................................... 181/292
See application file for complete search history.

(56) References Cited

U.S. PATENT DOCUMENTS

| | | | |
|---|---|---|---|
| 3,232,371 | A | 2/1966 | Reichert |
| 3,734,234 | A | 5/1973 | Wirt |
| 3,803,754 | A | 4/1974 | Fischer |
| 3,819,009 | A | 6/1974 | Mot |
| 3,831,710 | A | 8/1974 | Wirt |
| 3,850,261 | A | 11/1974 | Hehmann et al. |
| 3,905,443 | A | 9/1975 | Sieuzac |
| 3,913,702 | A | 10/1975 | Wirt et al. |
| 4,001,473 | A | 1/1977 | Cook |
| 4,035,535 | A | 7/1977 | Taylor |
| 4,074,496 | A | 2/1978 | Fischer |
| 4,141,433 | A | 2/1979 | Warnaka |
| 4,243,117 | A | 1/1981 | Warnaka |
| 4,265,955 | A | 5/1981 | Harp et al. |
| 4,291,080 | A | 9/1981 | Ely et al. |
| 4,298,090 | A | 11/1981 | Chapman |
| 4,339,018 | A | 7/1982 | Warnaka |
| 4,551,110 | A | 11/1985 | Selvage et al. |
| 4,676,762 | A | 6/1987 | Ballard |
| 5,353,502 | A | 10/1994 | Hattori et al. |
| 5,445,861 | A | 8/1995 | Newton et al. |
| 5,480,729 | A | 1/1996 | Hattori et al. |
| 5,690,035 | A | 11/1997 | Hatayama et al. |
| 5,959,264 | A | 9/1999 | Brück et al. |
| 6,182,787 | B1 | 2/2001 | Kraft et al. |
| 6,200,664 | B1 | 3/2001 | Figge et al. |
| 6,203,656 | B1 | 3/2001 | Syed |
| 6,206,136 | B1 | 3/2001 | Swindlehurst et al. |
| 6,209,679 | B1 | 4/2001 | Hogeboom et al. |
| 6,256,959 | B1* | 7/2001 | Palmersten ............... E04B 1/86 181/292 |
| 6,630,093 | B1 | 10/2003 | Jones |
| 6,772,857 | B2* | 8/2004 | Porte ....................... F02C 7/045 181/210 |
| 6,840,349 | B2 | 1/2005 | Andre et al. |
| 6,871,725 | B2 | 3/2005 | Johnson |
| 6,884,486 | B2 | 4/2005 | Estrin et al. |
| 6,913,570 | B2 | 7/2005 | Kehrle |
| 7,410,455 | B2 | 8/2008 | Akishev et al. |
| 7,484,592 | B2 | 2/2009 | Porte et al. |
| 7,510,052 | B2 | 3/2009 | Ayle |
| 7,866,377 | B2 | 1/2011 | Slaughter |
| 7,906,205 | B2 | 3/2011 | Meres |
| 7,921,966 | B2 | 4/2011 | Chiou et al. |
| 7,935,205 | B2* | 5/2011 | Bogue ................... B29C 73/06 156/252 |
| 7,954,224 | B2 | 6/2011 | Douglas |
| 7,963,362 | B2 | 6/2011 | Lidoine |
| 7,967,108 | B2* | 6/2011 | Harper .................... F02C 7/045 181/210 |
| 7,971,684 | B2 | 7/2011 | Gantie et al. |
| 8,016,230 | B2 | 9/2011 | Fogarty et al. |
| 8,047,326 | B2* | 11/2011 | Valleroy ................ G10K 11/172 181/214 |
| 8,464,831 | B2 | 6/2013 | Olander Burak et al. |
| 8,579,076 | B2 | 11/2013 | Ayle et al. |
| 8,689,936 | B2 | 4/2014 | Richter |
| 8,784,592 | B2 | 7/2014 | Kolax et al. |
| 8,789,652 | B2 | 7/2014 | Swallowe et al. |
| 8,905,189 | B2* | 12/2014 | Ayle ....................... F02C 7/045 181/213 |
| 8,985,513 | B2* | 3/2015 | Dean ........................ B64C 1/40 244/123.13 |
| 8,997,923 | B2 | 4/2015 | Ichihashi |
| 9,175,474 | B2 | 11/2015 | May et al. |
| 9,222,229 | B1 | 12/2015 | Chang et al. |
| 9,284,726 | B2 | 3/2016 | Tien |
| 9,290,274 | B2 | 3/2016 | Roach et al. |
| 9,296,044 | B2* | 3/2016 | Douglas .................... B32B 3/12 |
| 9,302,869 | B2 | 4/2016 | Kendrick et al. |
| 9,365,022 | B2 | 6/2016 | Kendrick et al. |
| 9,378,721 | B2 | 6/2016 | Zalewski et al. |
| 9,514,734 | B1 | 12/2016 | Jones et al. |
| 9,546,602 | B2 | 1/2017 | Julliard et al. |
| 9,607,600 | B2 | 3/2017 | Swallowe et al. |
| 9,693,166 | B2 | 6/2017 | Herrera et al. |
| 9,759,447 | B1 | 9/2017 | Mathur |
| 9,909,471 | B2 | 3/2018 | Mattia |
| 9,978,354 | B2 | 5/2018 | Nampy |
| 1,003,244 | A1 | 7/2018 | Linch et al. |
| 1,010,713 | A1 | 10/2018 | Jones et al. |
| 1,017,467 | A1 | 1/2019 | Martinez et al. |
| 2004/0048027 | A1 | 3/2004 | Hayes et al. |
| 2010/0307867 | A1 | 12/2010 | Ogawa et al. |
| 2011/0100749 | A1 | 5/2011 | Nonogi et al. |
| 2011/0244213 | A1 | 10/2011 | Jones |
| 2013/0306402 | A1 | 11/2013 | Todorovic |
| 2014/0133964 | A1 | 5/2014 | Ayle |
| 2014/0251481 | A1 | 9/2014 | Kroll et al. |
| 2014/0305529 | A1 | 10/2014 | Kroll et al. |
| 2014/0341744 | A1 | 11/2014 | Cazuc et al. |
| 2015/0027629 | A1 | 1/2015 | Butler et al. |
| 2015/0044413 | A1 | 2/2015 | Vauchel et al. |
| 2015/0064015 | A1 | 3/2015 | Perez |
| 2015/0110603 | A1 | 4/2015 | Biset et al. |
| 2015/0292413 | A1 | 10/2015 | Soria et al. |
| 2015/0373470 | A1 | 12/2015 | Herrera et al. |
| 2016/0010863 | A1 | 1/2016 | Ott et al. |
| 2016/0017775 | A1 | 1/2016 | Mattia |
| 2016/0017810 | A1 | 1/2016 | Lord et al. |
| 2016/0067938 | A1 | 3/2016 | Goodrich |
| 2016/0109130 | A1 | 4/2016 | Stastny et al. |
| 2016/0123160 | A1 | 5/2016 | Strock et al. |
| 2016/0319690 | A1 | 11/2016 | Lin et al. |
| 2017/0043550 | A1* | 2/2017 | Co C ................... B29C 66/2274 |
| 2017/0045059 | A1* | 2/2017 | Care ...................... F04D 29/083 |
| 2017/0072638 | A1 | 3/2017 | Hayes et al. |
| 2017/0191414 | A1 | 7/2017 | Martinez et al. |
| 2018/0016987 | A1 | 1/2018 | Howarth et al. |
| 2018/0162542 | A1 | 6/2018 | VanDeMark et al. |
| 2018/0174568 | A1 | 6/2018 | Porte et al. |
| 2018/0218723 | A1 | 8/2018 | Lin et al. |
| 2018/0245516 | A1 | 8/2018 | Howarth et al. |
| 2019/0080679 | A1 | 3/2019 | Alstad |
| 2019/0270504 | A1 | 9/2019 | Cedar et al. |
| 2020/0049068 | A1 | 2/2020 | Lin et al. |

FOREIGN PATENT DOCUMENTS

| | | |
|---|---|---|
| EP | 2960023 A1 | 12/2015 |
| EP | 9978354 B2 | 10/2017 |
| JP | S58156052 U | 10/1983 |
| JP | H0333897 A | 2/1991 |
| WO | WO2016/0133501 A1 | 8/2016 |

OTHER PUBLICATIONS

U.S. Appl. No. 15/911,260, filed Mar. 5, 2018.
Jones, et al., Evaluation of Parallel-Element, Variable-Impedance, Broadband Acoustic Liner Concepts, AIAA-2012-2194, Jun. 2012.
Martinson, Mechanical Design for 3D Printing, Nov. 2012, 15 pages. http://eikimartinson.com/engineering/3dparts/#dovetail.
Bertolucci, An Experimental Investigation of the Grazing Flow Impedance Duct at the University of Florida for Acoustic Liner Applications, University of Florida Dissertation, 2012, 217 Pages.

(56) References Cited

OTHER PUBLICATIONS

Bielak et al., Advanced Nacelle Acoustic Lining Concepts Development, NASA, CR-2002-211672, Aug. 2002, Total pages 203.
Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.
Dannemann et al., Experimental Study of Advanced Helmholtz Resonator Liners with Increased Acoustic Performance by Utilising Material Damping Effects, Applied Sciences, 2018, 18 Pages.
Kraft et al., Acoustic Treatment Design Scaling Methods, vol. 2: Advanced Treatment Impedance Models for High Frequency Ranges, NASA, CR-1999-209120, vol. 2, 1999, Total Pages 98.
Lawn, Acoustic Pressure Losses in Woven Screen Regenerators, ResearchGate, Applied Acoustics, vol. 77, Mar. 2014, pp. 42-48.
Malmary et al., Acoustic Impedance Measurement with Grazing Flow, AIAA-2001-2193, 7$^{th}$ AIAA/CEAS Aeroacoustics Conference, May 2001, Netherlands, 9 Pages.
Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.
Nark et al., Acoustic Liner Overview, Acoustics Technical Working Group Meeting, Nasa Langley Research Center, Cleveland, Oct. 22-23, 2019, pp. 1-25.
Primus et al., ONERA-NASA Cooperative Effort on Liner Impedance Education, AIAA 2013-2273, Research Gate, 19$^{th}$ AIAA/CEAS Aeroacoustics Conference, May 2013, Germany, 16 Pages.
Schiller et al., Experimental Evaluation of Acoustic Engine Liner Models Developed with Comsol Multiphysics, 23$^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.
Sellen et al., Noise Reduction in a Flow Duct: Implementation of a Hybrid Passive/Active Solution, Science Direct, Journal of Sound and Vibration, vol. 297, 2006, pp. 492-511.
Soderman et al., Design and Development of a Deep Acoustic Lining for the 40-by 80 Foot Wind Tunnel Test Station, NASA TP-2002-211850, Nov. 2002, 61 Pages.
Syed et al., Paper Number 07ATC-43 Development of the Acousti-Cap TM Technology Double-Layer Acoustic Liners in Aircraft Engine Nacelles, Research Gate, 2007 SAE International, 23 Pages.
Tam et al., Experimental Validation of Numerical Simulations for an Acoustic Liner in Grazing Flow, 30 Pages. https://ntrs.nasa.gov/archive/nasa/casi.ntrs.nasa.gov/20130014086.pdf.
Tam et al., Numerical Simulation of a Slit Resonator in a Grazing Flow, AIAA 2006-799, 44$^{th}$ AIAA Aerospace Meeting and Exhibit, Nevada, 2006, 20 Pages.
Zhang, Numerical Simulation of Two-Dimensional Acoustic Liners with High Speed Grazing Flow, MS Thesis, Urbana, Illinois, 2010, 90 Pages.
Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015, 70 Pages. http://www.diva-portal.org/smash/record.jsf?pid=diva2:813073.

* cited by examiner

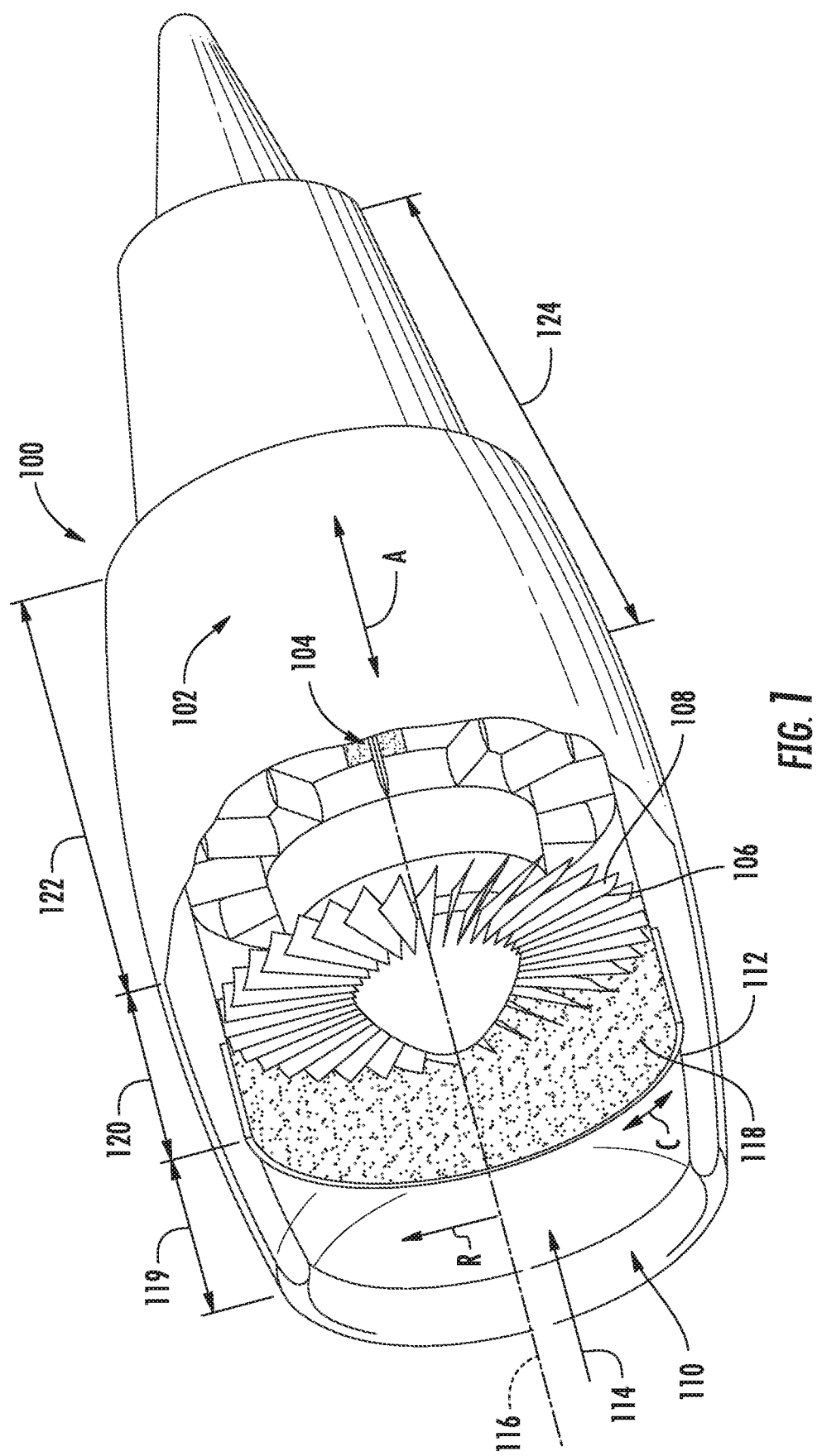

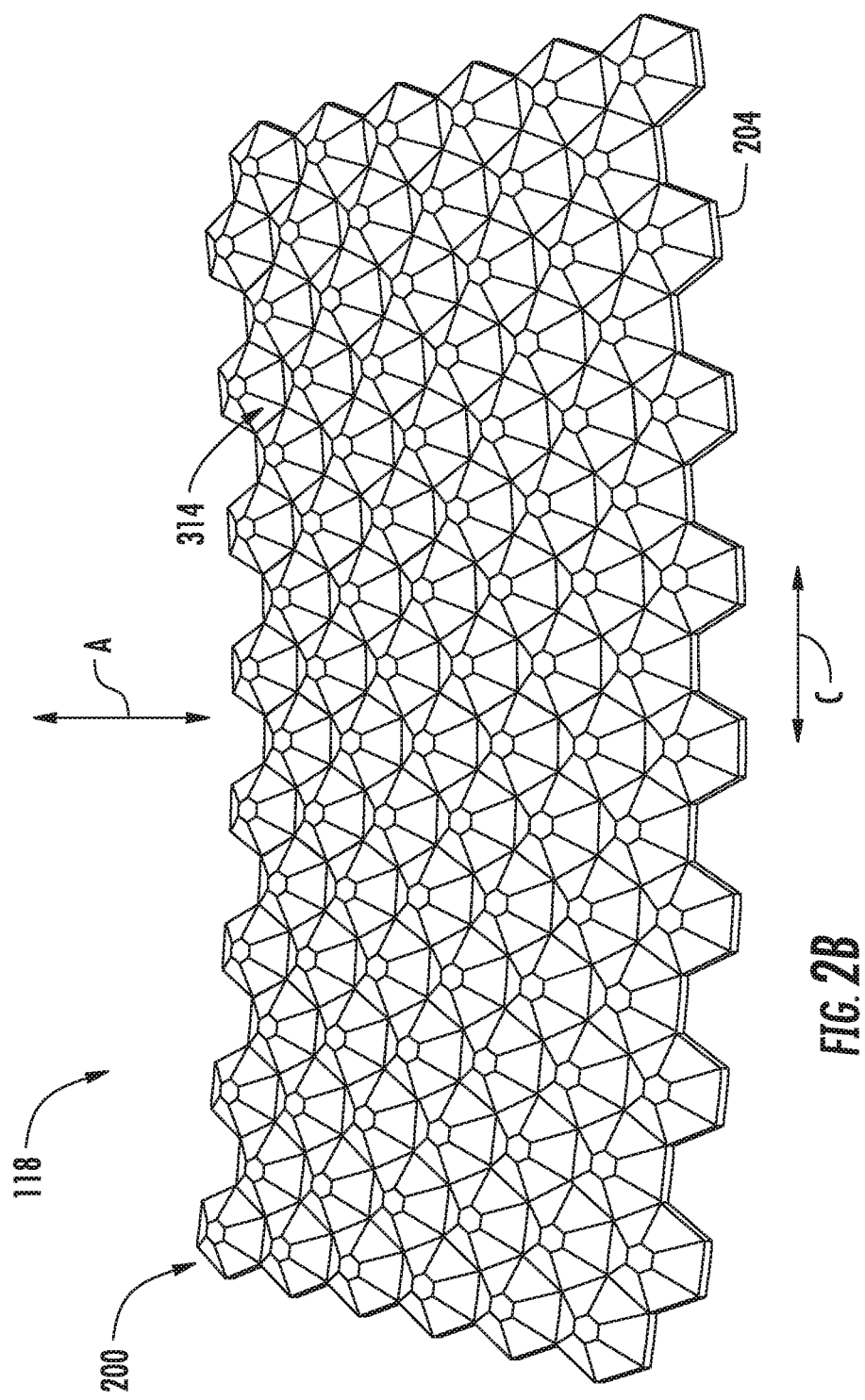

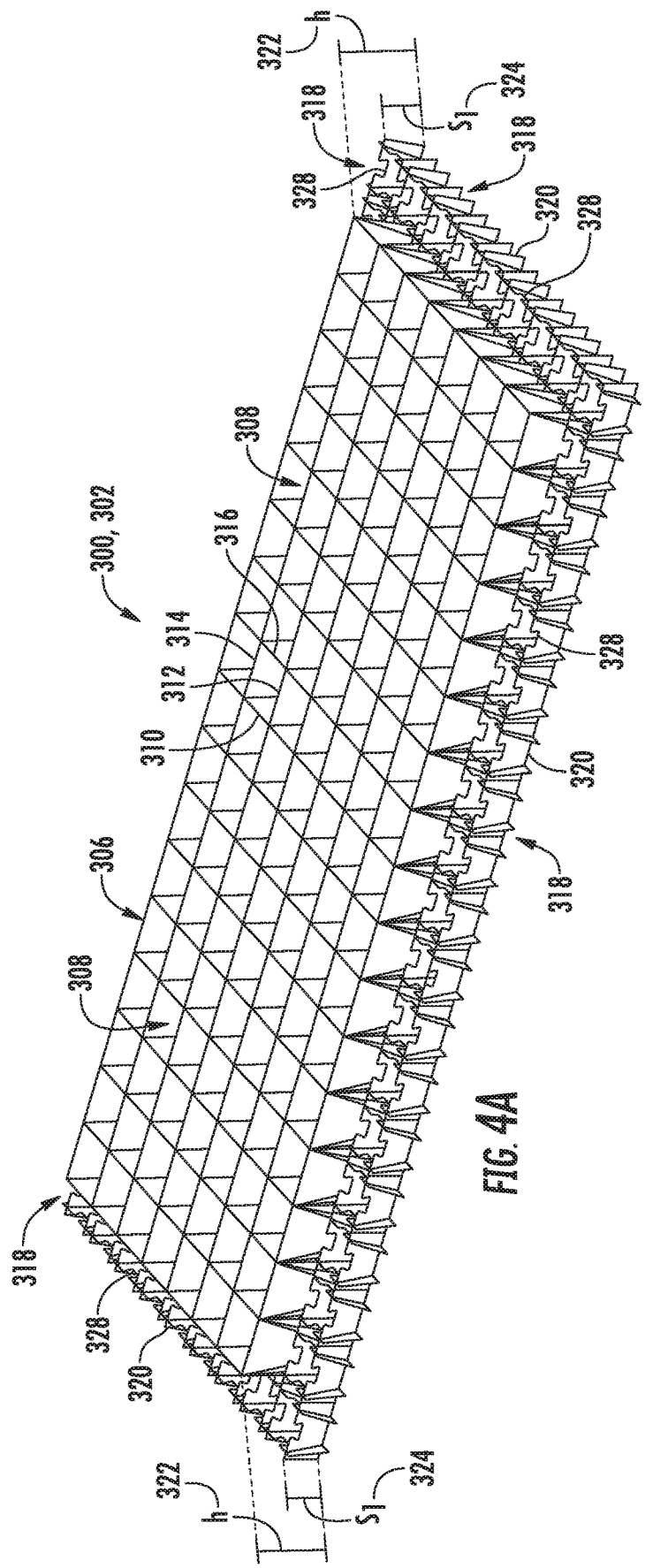
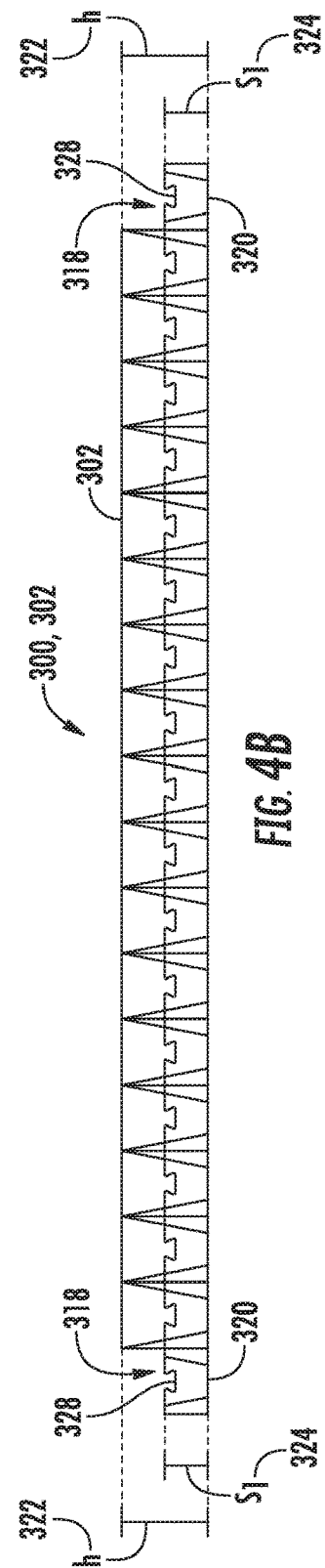
FIG. 4A
FIG. 4B ably with the written description, serve to explain the principles of the disclosed subject matter.

ACOUSTIC CORE ASSEMBLIES WITH MECHANICALLY JOINED ACOUSTIC CORE SEGMENTS, AND METHODS OF MECHANICALLY JOINING ACOUSTIC CORE SEGMENTS

FEDERALLY SPONSORED RESEARCH

This invention was made with government support under contract number DTFAWA-15-A-80013 with the United States Department of Transportation Federal Aviation Administration (FAA). The government may have certain rights in the invention.

FIELD

The present disclosure pertains generally to acoustic core assemblies made up of acoustic core segments that are mechanically joined with one another, and methods of mechanically joining acoustic core segments. More particularly, the present disclosure pertains to acoustic core segments joined with one another using a combination of splice joints and fastening elements, and methods of joining acoustic core segments with one another using such splice joints and fastening elements.

BACKGROUND

Acoustic liners may be used to dampen or attenuate sound waves. For example, acoustic liners are commonly used to dampen or attenuate noise from turbomachines such as turbofan engines. Typical acoustic liners include an acoustic core positioned between a perforated face sheet and a substantially imperforate back sheet. The perforated face sheet allows sound waves to enter the acoustic core. The acoustic core includes a plurality of resonant cells intended to dampen or attenuate sound waves.

An acoustic core assemblies may be assembled from a plurality of acoustic core segments, particularly when the acoustic core needs to cover a relatively large area. Acoustic core segments may be bonded with one another in a variety of ways. For example, one approach to bonding acoustic core segments with one another involves the use of a foam adhesive which fills the resonant cells around the seam. Resonant cells that are filled with such foam adhesive typically do not exhibit the desired acoustic dampening or attenuation properties intended of the acoustic core assembly. Consequently, seams between acoustic core segments may inhibit the noise dampening or attenuation performance of the acoustic core assembly, especially when the acoustic core assembly has several seams.

Mechanical systems have also been provided to bind acoustic core segments with one another. However, mechanical components that interfere with resonant cells around the seams may also inhibit or otherwise affect the acoustic dampening or attenuation performance of the acoustic core assembly. Additionally, some mechanical systems for binding acoustic core segments with one another tend to involve cumbersome or time consuming assembly processes, and nevertheless may not sufficiently secure the segments to one another.

Accordingly, there exists a need for improved acoustic core assemblies with mechanically joined acoustic core segments, and improved methods of mechanically joining acoustic core segments with one another.

BRIEF DESCRIPTION

Aspects and advantages will be set forth in part in the following description, or may be obvious from the description, or may be learned through practicing the presently disclosed subject matter.

In one aspect, the present disclosure embraces acoustic core segments that have an array of resonant cells that include splicing resonant cells. The resonant cells in the array include a plurality of cell walls and a resonant space defined by the plurality of cell walls. At least a portion of the resonant cells located along at least one perimeter region of the acoustic core segment are splicing resonant cells. The splicing resonant cells resemble a first segment of a whole resonant cell configured to overlap and align with counterpart splicing resonant cells of another acoustic core segment so as to define a splice joint. The counterpart splicing resonant cells resemble a second segment of a whole resonant cell corresponding in counterpart to the first segment so as to together resemble a whole resonant cell. At least some of the splicing resonant cells include one or more fastening elements configured to couple with a corresponding at least some of the counterpart splicing resonant cells thereby together defining coupled resonant cells comprising a coupled resonant space defined in part by the plurality of cell walls of the respective splicing resonant cell and in part by a plurality of cell walls of the respective corresponding counterpart splicing resonant cell.

In another aspect, the present disclosure embraces acoustic liners disposed annularly along a duct inner wall of a nacelle surrounding a turbomachine engine. The acoustic liners have an acoustic core assembly that includes a first acoustic core segment mechanically joined with a second acoustic core segment by a combination of splicing resonant cells of the first acoustic core segment overlapping and aligning with splicing resonant cells of the second acoustic core segment so as to define a splice joint, and a plurality of fastening elements integrally formed as part of the first acoustic core segment and/or the second acoustic segment, with the fastening elements coupling splicing resonant cells of the first acoustic core segment with splicing resonant cells of the second acoustic core segment.

In yet another aspect, the present disclosure embraces methods mechanically joining acoustic core segments. Exemplary methods include overlapping a first perimeter region of a first acoustic core segment with a second perimeter region of a second acoustic core segment thereby defining a splice joint, in which the splice joint includes a plurality of first splicing resonant cells of the first acoustic core segment and a plurality of second splicing resonant cells of the second acoustic core segment, and coupling at least some of the first splicing resonant cells with a corresponding at least some of the second splicing resonant cells at least in part by one or more fastening elements integrally formed as part of the at least some of the first splicing resonant cells and/or as part of the at least some of the second splicing resonant cells thereby together defining coupled resonant cells. The coupled resonant cells have a coupled resonant space defined in part by a plurality of cell walls of the respective first splicing resonant cell and in part by a plurality of cell walls of the respective second splicing resonant cell.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 1 shows a perspective partial cutaway view of a turbomachine that has an acoustic liner;

FIG. 2B shows an isometric perspective view of a portion of an exemplary acoustic liner with the face sheet removed to reveal an exemplary acoustic core assembly;

FIGS. 4A and 4B respectively show a perspective view and a side-view of an exemplary acoustic core segment;

Figure 2A:
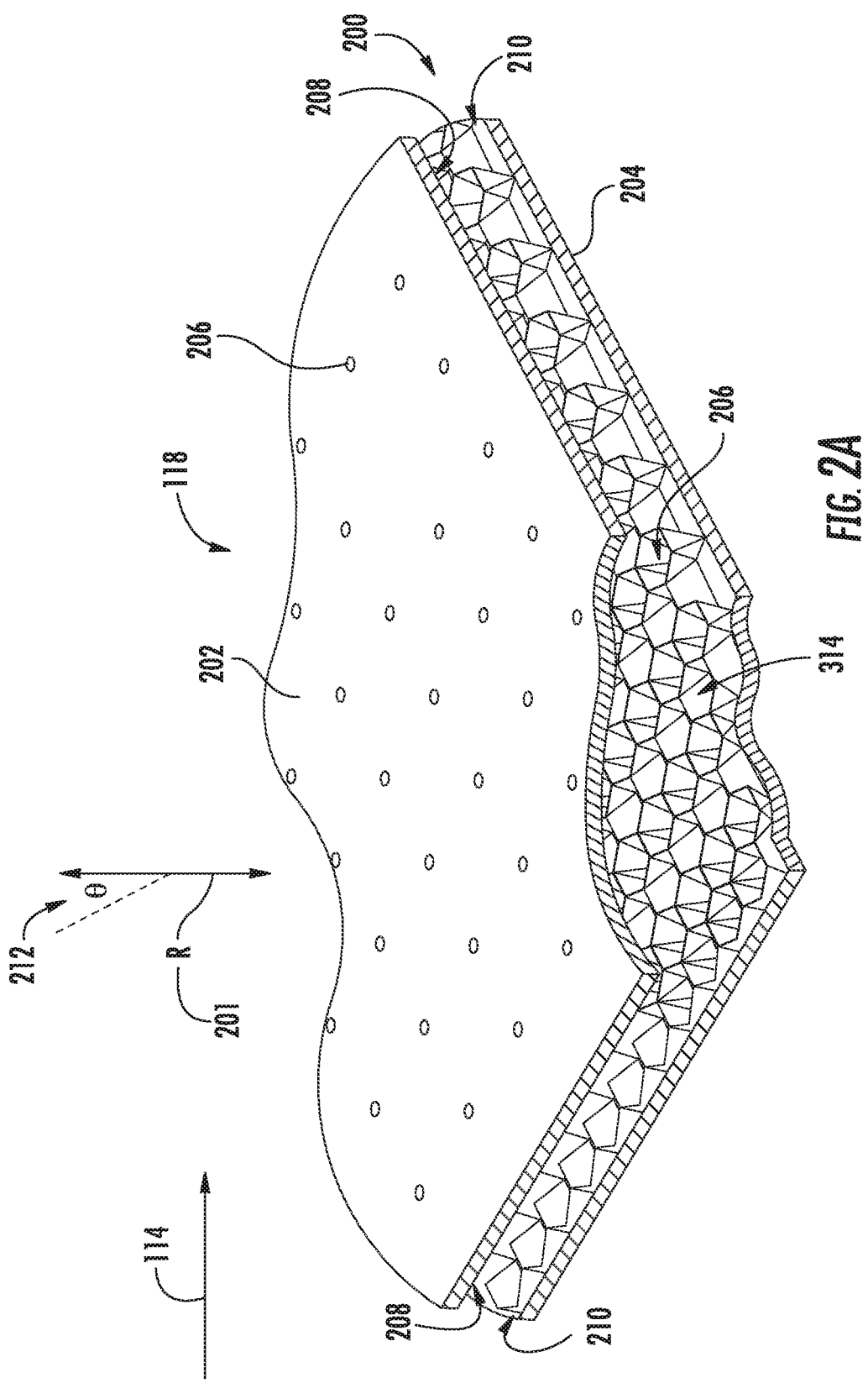
FIG. 2A shows an isometric partial cutaway view of a portion of an exemplary acoustic liner.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to acoustic core assemblies that include a plurality of acoustic core segments mechanically joined with one another using a combination of one or more splice joints and a plurality of fastening elements. The acoustic core segments include splicing resonant cells. The splicing resonant cells overlap and align with one another to provide coupled resonant cells held together by a splice joint and a plurality of fastening elements. The presently disclosed acoustic core assemblies allow for the coupled resonant cells to remain acoustically active, as the resonant cells are coupled with one another while avoiding acoustical interference with the coupled resonant space of the coupled resonant cells. Additionally, the presently disclosed acoustic core segments may be configured to inherently or intrinsically align respective splicing resonant cells of acoustic core segments being coupled with one another. The acoustic core segments may be assembled and disassembled with relative ease. Acoustic core segments may be provided with any configuration or arrangement that may be suitable for a particular setting. A plurality of acoustic core segments may be coupled with one another to provide acoustic core assemblies, including large acoustic core assemblies which may be impractical to manufacture as a single component.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with one another.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Referring to FIG. 1, a turbofan engine 100 includes a nacelle 102 surrounding a turbine 104 and a fan rotor 106, which includes a plurality of circumferentially spaced fan blades 108 powered by the turbine 104. The nacelle 102 defines an inlet 110 and a fan duct having a duct inner wall 112 that directs airflow 114 downstream through the fan rotor 106, generally along a longitudinal axial centerline 116. In some embodiments, one or more acoustic liners provide a system for damping or attenuating sound waves. The system includes one or more acoustic liners 118 disposed annularly along the duct inner wall 112. The one or more acoustic liners 118 may have a position along the duct inner wall 112 located upstream from the fan blades 108. One or more acoustic liners may also be positioned downstream from the fan blades 108. For example, an acoustic liner may be positioned at or aft of an inner barrel 119 portion of the nacelle 102. Additionally or alternatively, one or more acoustic liners 118 may be positioned at or aft of a fan casing portion 120 and/or a transcowl portion 122 of the nacelle 102. Additionally, one or more acoustic liners 118 may be positioned in proximity to non-rotating portions of the fan casing portion 120 or other components of the turbofan engine 100. These positions include ducts or casings within the turbofan engine 100 where an acoustic liner may be effective for noise suppression (e.g., damping or attenuation) at various frequency ranges. For example, one or more acoustic liners 118 may be positioned at a core cowl portion 124. Those skilled in the art will appreciate even further areas where acoustic liners may be positioned to dampen or attenuate noise generated by or emanating from various aspects of a turbofan engine.

In operation, a turbofan engine generates a tremendous amount of noise. To illustrate a typical source of turbofan engine noise, it will be appreciated that the fan rotor 106 rotates within the fan casing portion 120, producing discrete tonal noise predominately at a blade passage frequency (BPF) and multiples thereof. During take-off of the aircraft, the fan blades 108 reach transonic and supersonic rotational velocities, generating noise that propagates out of the fan duct into the surrounding environment. In exemplary embodiments, one or more acoustic liners 118 are configured and arranged to suppress noise resonating at the BPF and harmonics of the BPF. The one or more acoustic liners 118 or various portions thereof may be configured to dampen or attenuate sound waves and thereby reduce the sound at specific frequencies or across a range of frequencies. Some aspects of an acoustic liner 118 may be configured to reflect incident sound waves multiple times before the sound waves escape the acoustic liner 118. These multiple reflections may reduce the amplitude of the sound waves. Additionally, some aspects of an acoustic liner 118 may be configured to cause sound waves to become out-of-phase. When sound waves become out-of-phase, various portions of the sound waves tend to cancel one another, thereby reducing at least some of the energy in the sound waves. The acoustic liners 118 disclosed herein have acoustic core assemblies that include mechanically joined acoustic core segments configured to dampen or attenuate sound according to at least these modalities.

FIG. 2A shows an isometric partial cutaway view of a portion of an exemplary acoustic liner 118. This acoustic liner may be configured for use with the turbofan engine shown in FIG. 1 or for attenuating noise from any other source within the contemplation of those skilled in the art. In some embodiments, the acoustic liner 118 may be disposed proximate to airflow 114 (also shown in FIG. 1). The acoustic liner 118 may be secured within the turbofan engine 100 by a flange or other attachment with the duct inner wall 112 and/or the fan casing portion 120. The acoustic liner 118 includes an acoustic core assembly 200 positioned between a perforated face sheet 202 and a substantially imperforate back sheet 204. The acoustic core assembly 200 is made up of a plurality of acoustic core segments mechanically joined with one another as described herein.

The face sheet 202 includes a plurality of perforations 206 extending through a material of construction of the face sheet 202, and positioned and spaced in at least one of a repeating pattern and a random pattern. The perforations 206 allow sound waves to enter the cellular structure of the acoustic core assembly 200. The face sheet 202 may be formed of a wire mesh or a woven or nonwoven fibrous material that has perforations applied thereto or that has porous characteristics as formed. The face sheet 202 and back sheet 204 form planes having a generally parallel orientation relative to one another.

The acoustic core assembly 200 may be secured between the face sheet 202 and the back sheet 204 using an adhesive process. For example a thermal, sonic, or electric welding process may be used. Alternatively, an adhesive formulation such as a thermosetting or pressure sensitive adhesive or an adhesive tape may be used to secure the acoustic core assembly 200 in position. A thickness or height of the acoustic core 200 may be defined by a distance taken along an axis R 201 (also shown in FIG. 1) between an inside surface of the face sheet 202 and an inside surface of the back sheet 204. A top face 208 defines a first linear or curved surface of the acoustic core assembly 200 and a bottom face 210 defines a second linear or curved surface of the acoustic core assembly 200. The top face 208 resides adjacent to and oriented towards the inside surface of the face sheet 202, and the bottom face 210 resides adjacent to and oriented towards the inside surface of the back sheet 204. The axis R 201 represents a normal line relative to the normal surface corresponding to the top face and/or the bottom face. The axis R may be a radial or other axis as the context requires. In this exemplary embodiment, the terms "inner" and "outer" refer to the orientation of the respective layers in relation to the longitudinal axial centerline 116 shown in FIG. 1.

The face sheet 202, the back sheet 204, and the acoustic core assembly 200 may together form an arcuate or cylindrical acoustic liner 118 (see, e.g., FIG. 1), a portion of which is shown in FIG. 2A. A noise source (e.g., fan blades 108 of fan rotor 106) is thus positioned within the arcuate or cylindrical acoustic liner 118. The porous face sheet 202 of the acoustic liner typically orientates towards the noise source, with the back sheet 204 typically being more distal from the noise source relative to the face sheet 202. In an alternative embodiment, the face sheet 202, the back sheet 204, and the acoustic core assembly 200 may together form an acoustic liner 118 that has a substantially flat planar profile. For example, and without limitation, an enclosed volume such as a room or an engine casing may contain a noise source such as noisy machinery, and one or more walls or other aspects of such an enclosed volume may be lined with a substantially flat acoustic liner 118.

In still other embodiments, the face sheet 202, the back sheet 204, and the acoustic core assembly 200 may together form a complexly curved acoustic liner 118. For example, and without limitation, one or more complexly curved walls or other aspects of a nacelle or a noise source-containing room or space may be at least partially lined with a complexly curved acoustic liner 118. For example, FIG. 2B shows an exemplary curved acoustic liner. The curve may be configured to correspond to the contour of a mounting location, such as a location 112, 119, 120, 122 within a nacelle 102 of a turbofan engine 100. The face sheet 202 of the acoustic liner 118 has been omitted from FIG. 2B to further illustrate the acoustic core assembly 200.

Figure 3A:
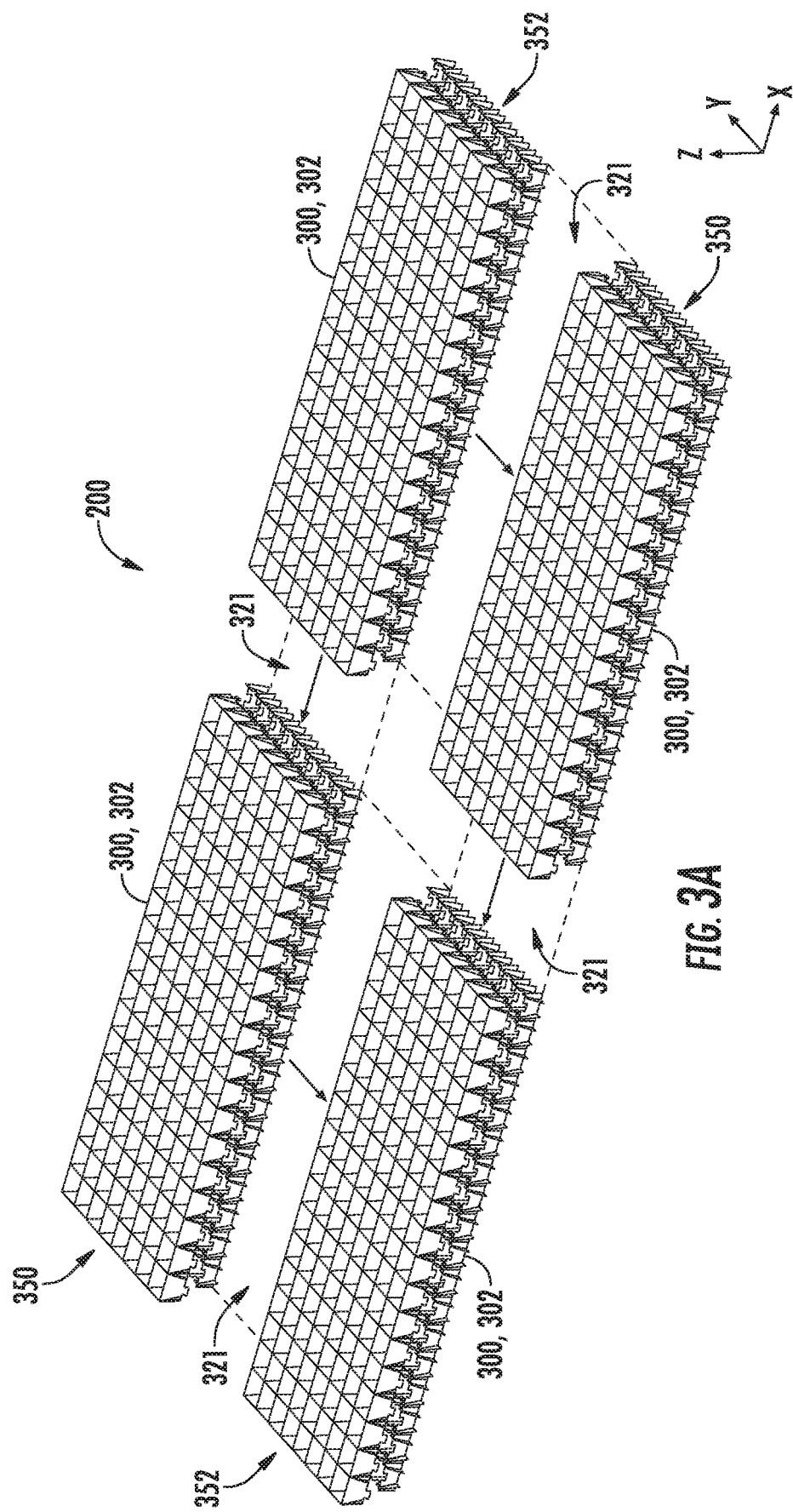
FIGS. 3A and 3B show exemplary acoustic core segments that may be coupled with a combination of splice joints and fastening elements to provide an acoustic core assembly.
Figure 3B:
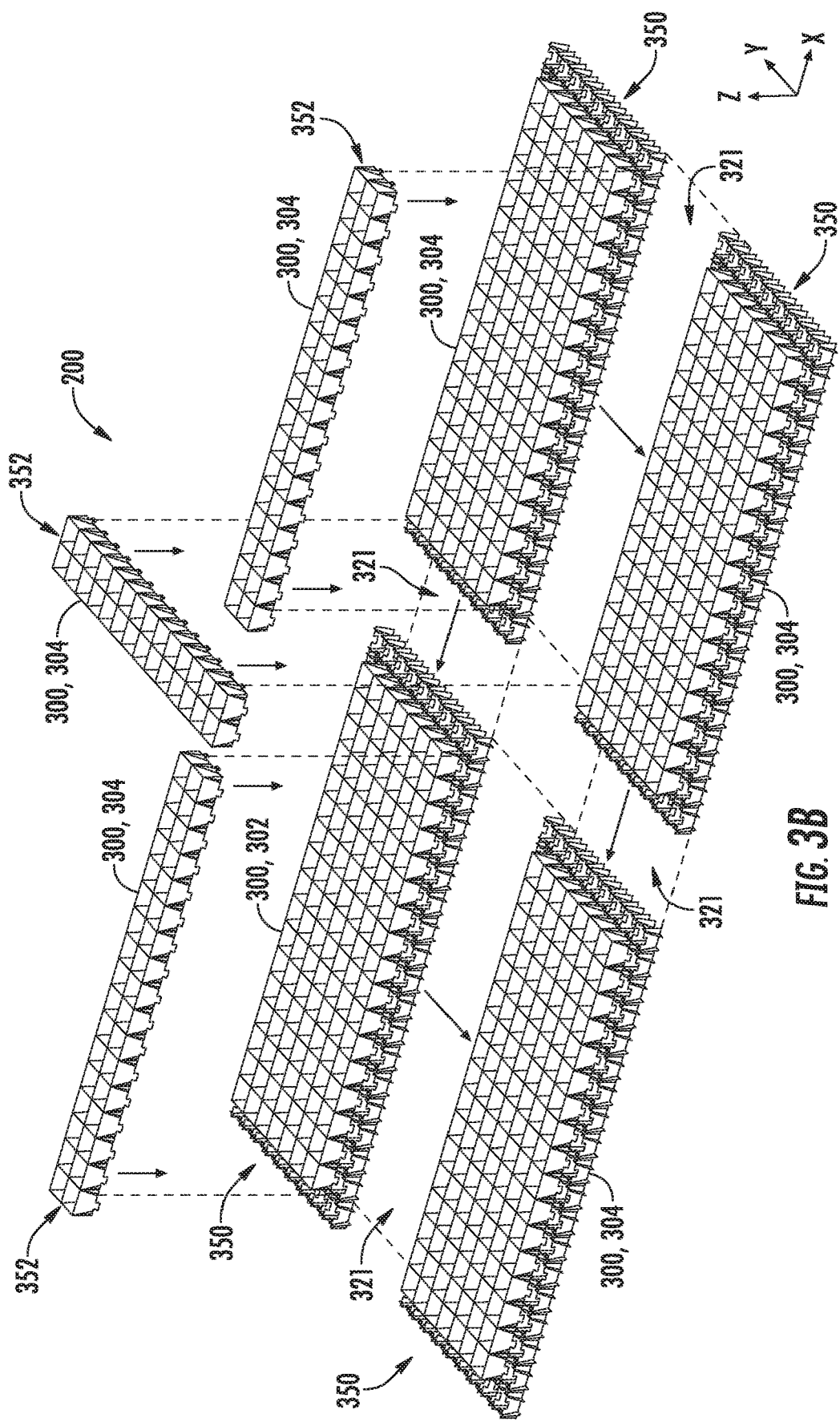
Figure 3C:
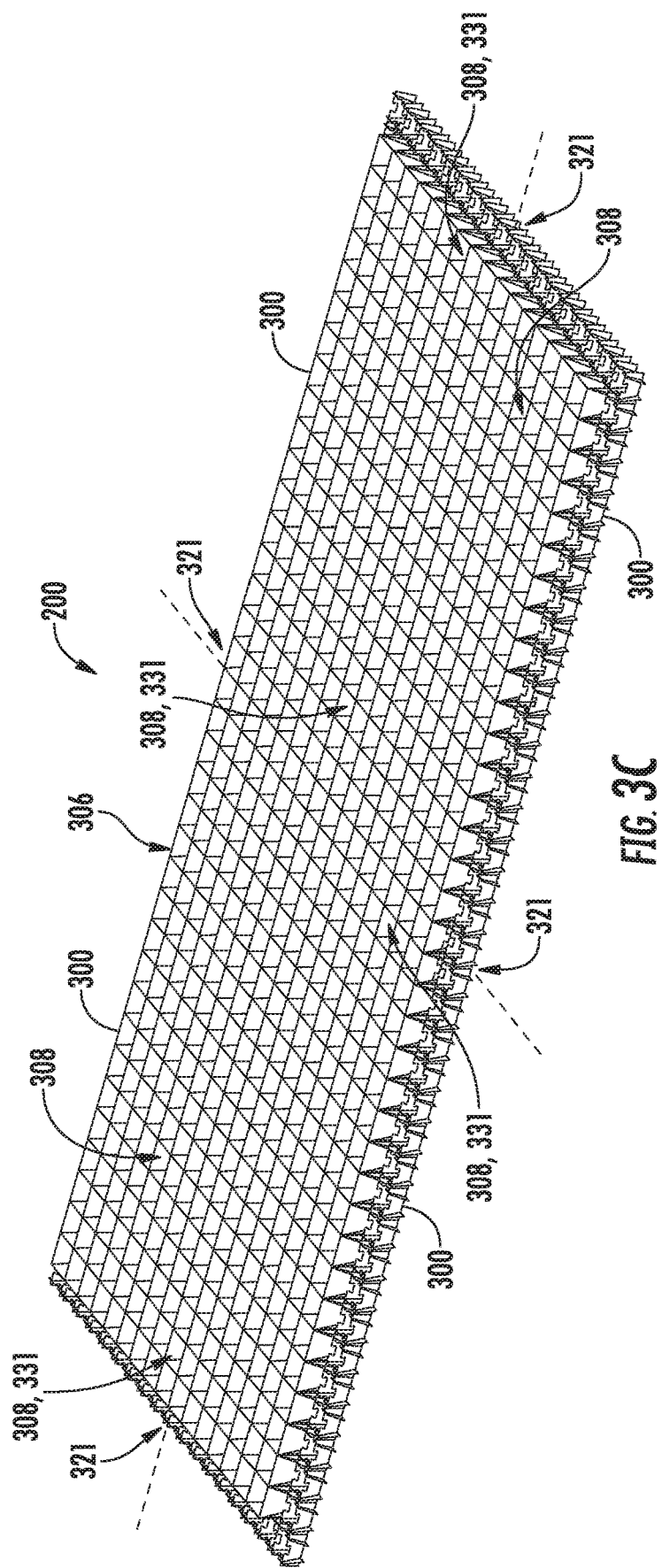
FIG. 3C shows an exemplary acoustic core assembly which may be assembled from the acoustic core segments of FIG. 3A or 3B.

An acoustic core assembly 200 may include any desired number of acoustic core segments. FIGS. 3A-3C show exemplary embodiments of an acoustic core assembly 200 that may be assembled from a plurality of acoustic core segments 300. As shown in FIG. 3A, in some embodiments an acoustic core assembly 200 may be assembled from a plurality of acoustic core segments 300 that include panel segments 302. Additionally, or in the alternative, as shown in FIG. 3B, in some embodiments an acoustic core assembly 200 may be assembled from a plurality of acoustic core segments 300 that include a plurality of panel segments 302 and plurality of splice segments 304. An exemplary acoustic core segment 300 that embodies a panel segment 302 is shown in further detail in FIGS. 4A and 4B. An exemplary acoustic core segment 300 that embodies a splice segment 304 is shown in further detail in FIG. 5. As shown, the acoustic core assembly 200 and the acoustic core segments 300 are generally flat. However, it will be appreciated that an acoustic core assembly 200 also may be assembled from a plurality of acoustic core segments 300 so as to provide an arcuate cylindrical acoustic core assembly 200 and/or a complexly curved acoustic core assembly 200. Additionally, it will be appreciated that acoustic core segments 300 may be provided with an arcuate and/or complexly curved configuration. In fact, the acoustic core segments 300 may have any desired size, shape, and/or configuration.

The acoustic core segments 300 (e.g. panel segments 302 and/or splice segments 304) that make up the acoustic core assembly 200 have an array of hollow cellular structures or resonant cells 306. The array of resonant cells 306 may include any number of resonant cells 306 arranged in a contiguous and/or non-contiguous manner. An acoustic core segment 300 may have any desired number of resonant cells 306. The resonant cells 306 have a plurality of cell walls, and a resonant space 308 defined by the plurality of cell walls. As shown, the array of resonant cells 306 includes resonant cells that have four cell walls. That is, an exemplary resonant cell 306 may have a first cell wall 310, a second cell wall 312, a third cell wall 314, and a fourth cell wall 316, and those four cell walls together define the perimeter of a resonant space 308. However, it will be appreciated that resonant cells 306 may be provided with any desired number of cell walls, and the example shown is not intended to be taken in a limiting sense. The resonant cells 306 may have any polyhedral structures or combination of structures, including parallel polyhedral cellular structures and/or oblique polyhedral cellular structures.

A portion of the resonant cells 306 located along at least one perimeter region 318 of the acoustic core segment 300 are splicing resonant cells 320. The splicing resonant cells 320 are configured to overlap and align with counterpart splicing resonant cells 320 of another acoustic core segment 300 so as to define a splice joint 321. The splice joint 321 may be configured to allow splicing resonant cells 320 of respective acoustic core segments 300 to overlap and align with one another in a manner such that the splicing resonant cells 320 of the respective acoustic core segments 300 together resemble a whole resonant cell 306. A perimeter region 318 may include one or more rows of splicing resonant cells 320. While the perimeter region 318 shown in FIGS. 4A and 4B includes one row of splicing resonant cells 320, it will be appreciated that a perimeter region also may include several rows of splicing resonant cells 320, such as from 1 to 200 rows of splicing resonant cells 320, such as from 1 to 10 rows of splicing resonant cells 320, such as from 10 to 50 rows of splicing resonant cells 320, such as from 50 to 100 rows of splicing resonant cells 320, such as from 100 to 200 rows of splicing resonant cells. A perimeter region may include at least 1 row of splicing resonant cells 320, such as at least 2 rows, such as at least 5 rows, such as at least 7 rows, such as at least 9 rows. In some embodiments, an acoustic core segment 300 may be composed entirely of splicing resonant cells 320. For example, as shown in FIG. 5, a splice segment 304 may be composed entirely of splicing resonant cells 320 such that all of the resonant cells 306 of the acoustic core segment 300, 304 overlap and align with corresponding counterpart splicing resonant cells 320 of another acoustic core segment 300.

To provide a splice joint 321, the splicing resonant cells 320 have a height that is less than the height of other resonant cells 306 within the acoustic core segment 300. For example, as shown in FIGS. 4A and 4B, a plurality of resonant cells 306 within the acoustic core segment 300 have a height, h 322 and the splicing resonant cells 320 have a height, $s_1$ 324. Further to this example, as shown in FIG. 5, counterpart splicing resonant cells 320 have a height, $s_2$ 326. The splicing resonant cells 320 having a height $s_1$ 324 resemble a first segment of a whole resonant cell 306. The counterpart splicing resonant cells 320 having a height $s_2$ 326 resemble a second segment of a whole resonant cell 306. The first segment and the second segment together resemble a whole resonant cell 306. The splicing resonant cells 320 may thereby overlap and align with counterpart splicing resonant cells 320 of another acoustic core segment 300 so as to define a splice joint. The splice joint includes splicing resonant cells 320 that resemble first segments overlapping and aligning with corresponding counterpart splicing resonant cells 320 that resemble second segments.

Figure 5:
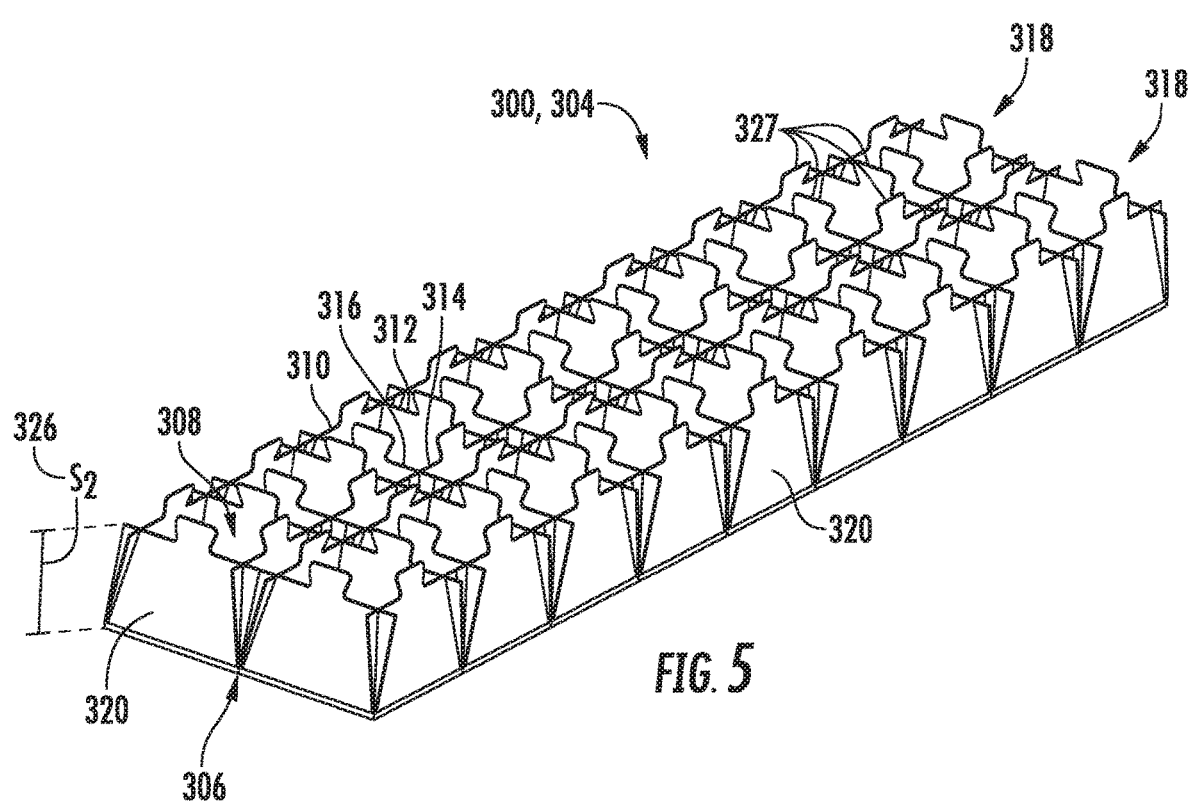
FIG. 5 shows a perspective view of another exemplary acoustic core segment.

As shown in FIGS. 4A and 4B, and in FIG. 5, the splicing resonant cells 320 have a height 324 that corresponds to about 50% of the height 322 of a whole resonant cell 306. However, it will be appreciated that a splicing resonant cell 320 may have a height 324 that resembles any other segment of a whole resonant cell 306. For example, splicing resonant cells 320 may have a height 324 that corresponds to from 10% to 90% of the height 322 of a whole resonant cell 306, such as from 20% to 80%, such as from 30% to 70%, such as from 40% to 60%. The height 324 of a splicing resonant cell 320 may be at least 10% of the height 322 of a whole resonant cell 306, such as at least 20%, such as at least 30%, such as at least 40%, such as at least 50%, such as at least 60%, such as at least 70%, such as at least 80%, or such as at least 90%. The height 324 of a splicing resonant cell 320 may be less than 90% of the height 322 of a whole resonant cell 306, such as less than 80%, such as less than 70%, such as less than 60%, such as less than 50%, such as less than 40%, such as less than 30%, such as less than 20%, or such as less than 10%. The height of a splicing resonant cell 320 that resemble a first segment and the height of a corresponding counterpart splicing resonant cell 320 that resemble a second segment may have a combined height when coupled together that correspond to about 100% of the height 322 of a whole resonant cell 306. However, in some embodiments the combined height of a first segment and second segment may differ from the height 322 of a whole resonant cell 306, such as from 90% to 110% of the height of a whole resonant cell 306, such as from 95% to 105%, such as from 99% to 101%.

Preferably, the height of splicing resonant cells 320 that resemble first segments together with the height of a corresponding counterpart splicing resonant cells 320 that resemble second segments correspond to about 100% of the height 322 of a whole resonant cells 306 so that the splicing resonant cells 320 throughout the splice joint 321 conform to the array of resonant cells 306. These splicing resonant cells 320 are acoustically active and preferably have acoustic damping and attenuation properties similar to other resonant cells 306 within the array. However, it will be appreciated that the array of resonant cells 306 may include a plurality of subsets of resonant cells 306 with different configurations as between one subset and another, including correspondingly different acoustic damping and attenuation properties, and splicing resonant cells 320 or portions thereof may be configured corresponding to one or more of the plurality of subsets.

The splicing resonant cells 320 may be located at one or more perimeter regions 318 of the acoustic core segment 300. As shown in FIGS. 4A and 4B, the splicing resonant cells 320 are located at perimeter regions 318 of one or more sides of the acoustic core segment 300. However, it will be appreciated that the splicing resonant cells 320 need not be located at a perimeter region 318 of every side of the acoustic core segment 300, but instead may be located at only those sides which are intended to be couplable to another acoustic core segment 300. Additionally, a perimeter region 318 may encompass only a portion of a side intended to be couplable to another acoustic core segment 300.

Figure 6A:
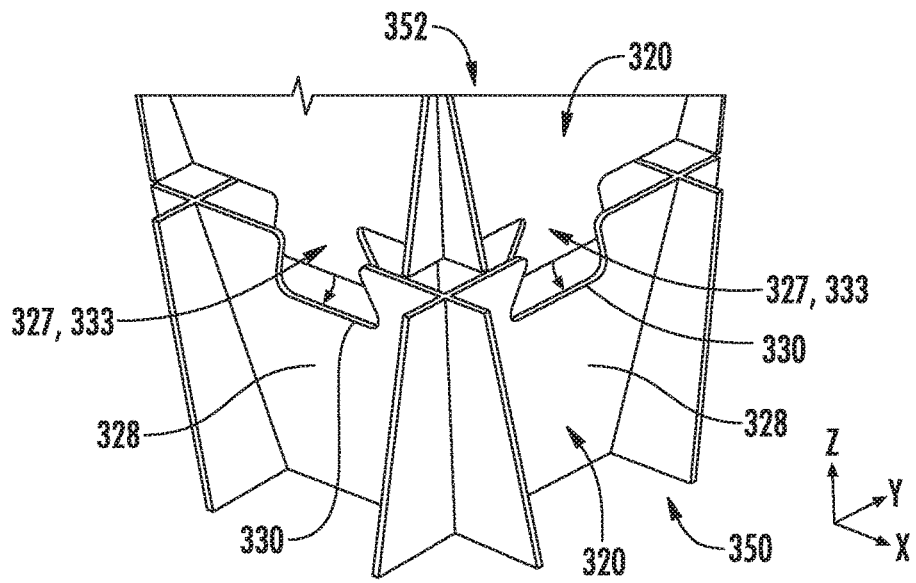
FIGS. 6A and 6B respectively show a splice joint between the acoustic core segment of FIGS. 4A/4B and the acoustic core segment of FIG. 5.
Figure 6B:
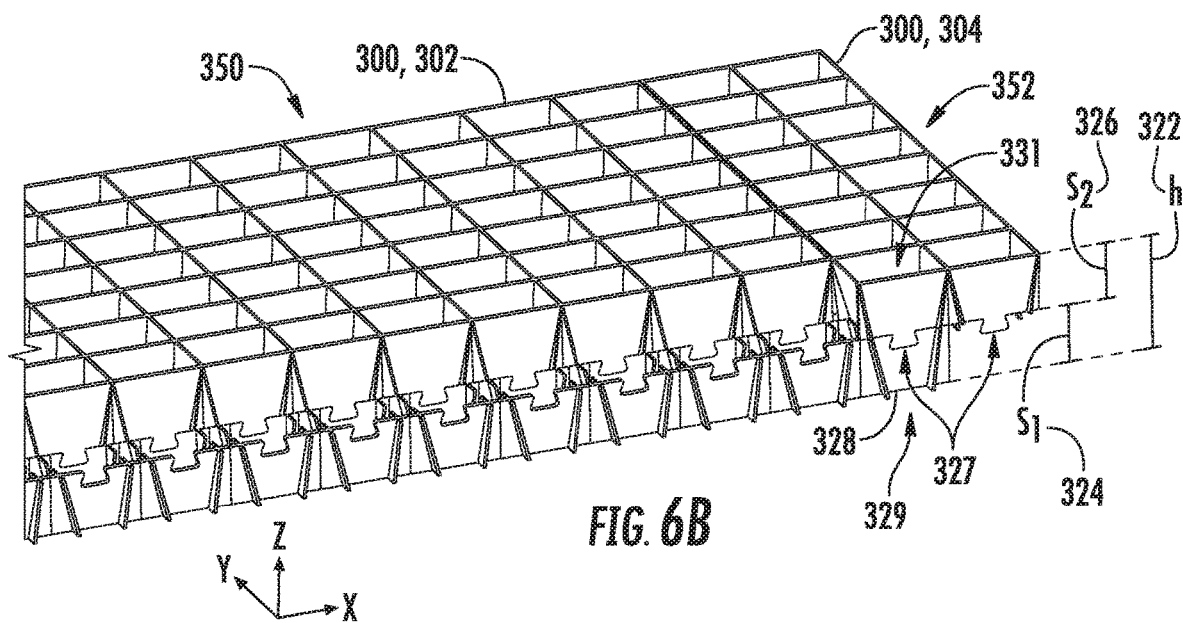

In addition to splice joints 321, the acoustic core segments 300 disclosed herein may be coupled with another acoustic core segment 300 by one or more fastening elements 327. Exemplary fastening elements 327 include static fastening elements 327 in the sense that such exemplary fastening elements 327 are integrally formed as part the acoustic core segments 300. FIG. 6A shows exemplary fastening elements 327, and FIG. 6B shows acoustic core segments 300 coupled with one another by a plurality of fastening elements 327. At least some of the acoustic core segments 300 may include fastening elements 327. The fastening elements 327 may be located on least some of the splicing resonant cells 320 of those acoustic core segments 300 that include such fastening elements 327. At least some of the splicing resonant cells 320 include one or more cell walls 328 configured to couple with a corresponding at least some of the counterpart splicing resonant cells 320 at least in part by one or more fastening elements 327. The one or more fastening elements 327 may be integrally formed as part of a splicing resonant cell 320. For example, a splicing resonant cell 320 and/or a corresponding counterpart splicing resonant cell 320 may include a fastening element 327. The splicing resonant cells 320 that are coupled together define coupled resonant cells 329. The coupled resonant cells 329 include a coupled resonant space 331 defined in part by the respective plurality of cell walls of the coupled splicing resonant cells 320.

Referring again to FIGS. 3A and 3B, in some embodiments an acoustic core assembly 200 may include a plurality of acoustic core segments 300, such as a first acoustic core segment 350 and a second acoustic core segment 352. As shown in FIG. 3A, both the first acoustic core segment 350 and the second acoustic core segment 352 may embody a panel segment 302. As shown in FIG. 3B, the first acoustic core segment 350 may embody a panel segment 302 and the second acoustic core segment 352 may embody a splice segment 304. The first acoustic core segment 350 and the second acoustic core segment 352 may include a splice joint 321 and one or more fastening elements 327. As shown in FIGS. 4A and 4B, the first acoustic core segment 350 includes a first perimeter region 318 that includes first splicing resonant cells 320. The first splicing resonant cells 320 resemble a first segment of a whole resonant cell 306 with respect to height 322. As shown, for example, in FIGS. 5 and 6B, the second acoustic core segment 352 has a second perimeter region 318 that includes second splicing resonant cells 320 resembling a second segment of a whole resonant cell 306 corresponding in counterpart to the first segment so as to together resemble a whole resonant cell 306, the first splicing resonant cells 320 and the second splicing resonant cells 320 overlap and align with one another, thereby defining a splice joint 321. At least some of the first splicing resonant cells 320 include one or more cell walls 328 configured to be coupled with a corresponding at least some of the second splicing resonant cells 320 at least in part by one or more fastening elements 327 thereby together defining coupled resonant cells 329. The one or more fastening elements 327 may be integrally formed as part of the respective first splicing resonant cell 320 and/or as part of the respective second splicing resonant cell 320. The coupled resonant cells 329 include a coupled resonant space 331 defined in part by the plurality of cell walls of the respective first splicing resonant cell 320 and in part by the plurality of cell walls of the respective second splicing resonant cell 320.

Figure 7A:
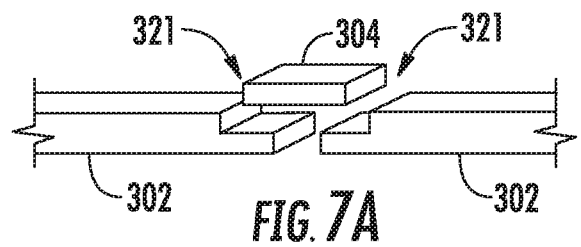
FIGS. 7A-7F show exemplary splice joints that may be included in acoustic core segments couplable with one another to provide an acoustic core assembly.
Figure 7B:
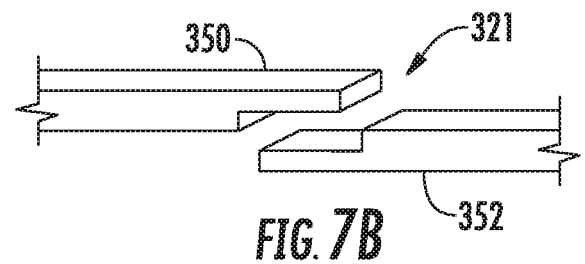
Figure 7C:
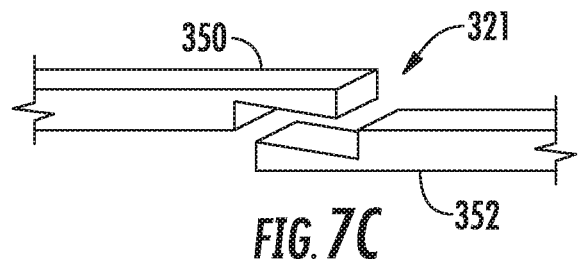
Figure 7D:
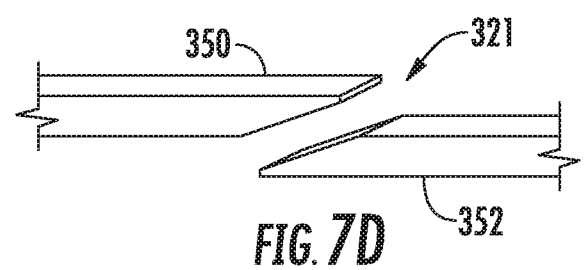
Figure 7E:
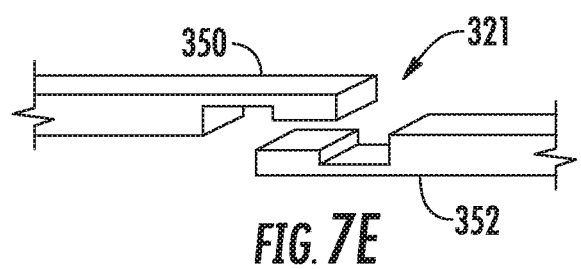
Figure 7F:
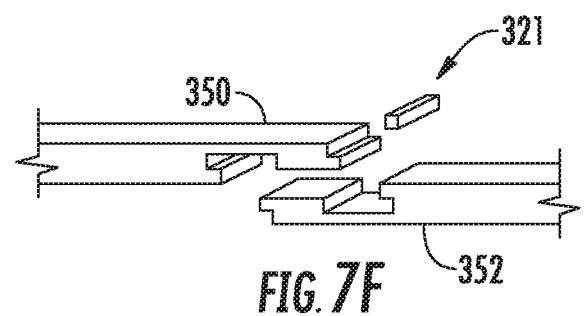

The splice joint 321 may be configured in any number of ways such that respective splicing resonant cells 320 overlap and align with one another. For example, several exemplary spice joints 321 are shown in FIGS. 7A-7F. As shown in FIG. 7A, a splice joint 321 may include a panel segment 302 and a splice segment 304. As shown in FIGS. 7B-7F, a splice joint 321 may include a first acoustic core segment 350 and a second acoustic core segment 352. As further examples, a splice joint may include a half-lap splice (FIG. 7A, 7B), a bevel-lap splice (FIG. 7C), a scarf splice (FIG. 7D), a tabled splice (FIG. 7E), or a wedged table splice (FIG. 7F). The foregoing exemplary splice joints are provided by way of example and are not to be limiting. In fact, other exemplary splice joints will be within the contemplation of those skilled in the art in light of the present disclosure, all of which are within the spirit and scope of the present disclosure.

The fastening elements 327 may be configured in any number of ways so as to couple the splicing resonant cells 320 of respective acoustic core segments 300. Exemplary fastening element 327 may take the form of a protuberance, such as a dovetail fastener or a cantilever fastener. In some embodiments, a fastening element 327 may be configured to inherently or intrinsically align respective splicing resonant cells 320 of acoustic core segments 300 being coupled with one another. This inherent or intrinsic alignment may be accomplished by configuring the fastening elements 327 such that, as the splicing resonant cells 300 of respective acoustic core segments 300 are brought near one another to form a splice joint 321, the fastening elements 327 of one acoustic core segment 300 fit at least partially within a respective resonant space 308 of the splicing resonant cells 320 of the corresponding counterpart acoustic core segment 300.

With the fastening elements 327 fitting at least partially within the respective resonant spaces 308, the respective splicing resonant cells 300 may be drawn into alignment with one another guided at least in part by the fastening elements 327. The fastening elements 327 may snap into position with corresponding cell walls 328 as the respective splicing resonant cells 300 are coupled with one another. The fastening elements 327 may thereby allow for acoustic core assemblies 200 to be assembled from a plurality of acoustic core segments 300, providing for proper alignment of the acoustic core segments 300 and the respective splicing resonant cells 320 thereof without requiring measurement or alignment tools. Typically the fastening elements 327 may be introduced to the splicing resonant cells 320 of a corresponding counterpart acoustic core segment 300 in a z-direction. However, the acoustic core segments 300 need not be brought together in perfect alignment at least in part because the fastening elements 327 intrinsically or inherently align the respective splicing resonant cells 302 as the acoustic core segments 300 are brought together. Additionally, or in the alternative, in some embodiments fastening elements 327 may be introduced in a direction other than the z-direction, such as an x-direction or a y-direction, or a combination of the z-direction, the x-direction, and/or the y-direction.

In some embodiments, inherent or intrinsic alignment of the fastening elements 327 may be enhanced when the splicing resonant cells 320 have an oblique polyhedral cellular structure. Splicing resonant cells 320 with an oblique polyhedral cellular structure include one or more sloped cell walls relative to the z-direction. When coupling a fastening element 327 with a corresponding sloped cell wall 328, a lateral distance between the fastening element 327 and the cell wall 328 may converge, thereby guiding the fastening element 327 into position with the cell wall 328 and aligning the splicing resonant cells 320 of the respective acoustic core segments 300 with one another. The acoustic core segments 300 shown in FIGS. 3A, 3B, 9A, and 10A include splicing resonant cells 320 with an oblique polyhedral cellular structure. Such oblique polyhedral cellular structures are described in more detail below with reference to FIGS. 14A-14C and FIG. 15.

Figure 8A:
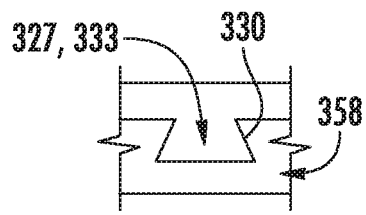
FIGS. 8A-8H show exemplary fastening elements that may be included in acoustic core segments couplable with one another to provide an acoustic core assembly.
Figure 8E:
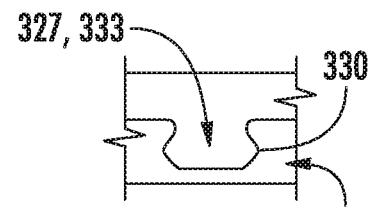
Figure 8B:
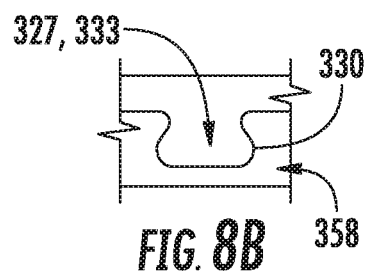
Figure 8F:
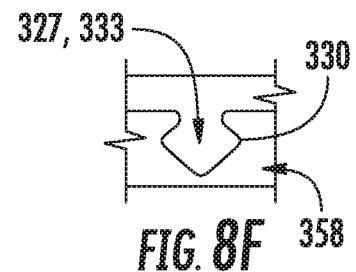
Figure 8C:
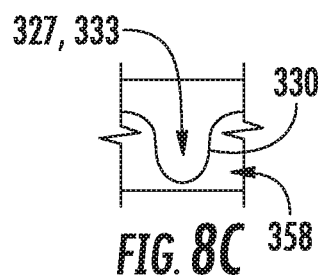
Figure 8G:
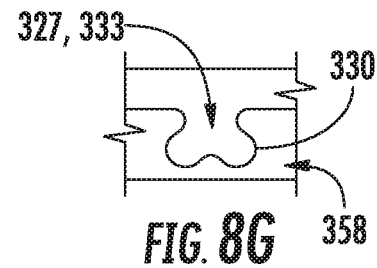
Figure 8D:
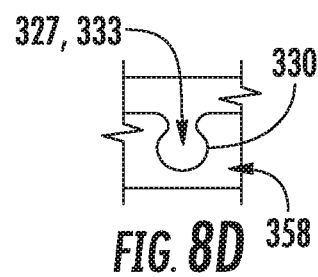
Figure 8H:
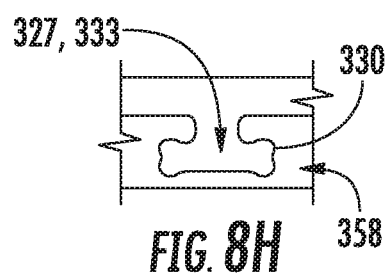

In some embodiments, a fastening element 327 may include a dovetail fastener 333. For example, the fastening elements 327 of the acoustic core segments 300 shown in FIGS. 3A and 3B include a dovetail fastener 333. FIG. 6A shows an enlarged view of an exemplary dovetail fastener 333. As shown, cell walls 328 configured to couple with a dovetail fastener 333 may include a recess 330 corresponding to the shape of the shape of the fastening element 327, such as a dovetail fastener 333. As shown in FIG. 6A, a dovetail fastener 333 may snap into a corresponding recess 330. In some embodiments, a plurality of dovetail fasteners 333 may intrinsically or inherently align with the corresponding recesses 330, and thereby correspondingly align the splicing resonant cells 320 of respective acoustic core segments 300. Acoustic core segments 300 may be configured to provide coupled resonant cells 329 with an oblique polyhedral cellular structure that are coupled with a dovetail fastener. One or more dovetail fasteners 333 may be integrally formed as part of the splicing resonant cells 320 of a first acoustic core segment 350 and/or as part of the splicing resonant cells 320 of a second acoustic core segment 352. Several additional exemplary dovetail fasteners are shown in FIGS. 8A-8H. As examples, a dovetail fastener may include a wedged dovetail fastener (FIG. 8A), a key dovetail fastener (FIG. 8B), a wave dovetail fastener (FIG. 8C), a lollipop dovetail fastener (FIG. 8D), a hexagonal dovetail fastener (FIG. 8E), an arrowhead dovetail fastener (FIG. 8F), a heart dovetail fastener (FIG. 8G), or a dog-bone dovetail fastener (FIG. 8H).

When the coupled resonant cells 329 have an oblique polyhedral cellular structure, the splicing resonant cells 320 may have a cross-sectional plane perpendicular to the z-axis that diverges (i.e., increases in area) when approaching the splice joint 321 from the first acoustic core segment 350 and converges (i.e., decrease in area) when approaching the splice joint 321 from the second acoustic core segment 352. In some embodiments, it may be preferable to include one or more dovetail fasteners 333 with the splicing resonant cells 320 that have such a converging cross-sectional plane, such as the second acoustic core segment 352 as shown in FIG. 6A. Likewise, it may be preferable to include one or more recesses 330 corresponding to the one or more dovetail fasteners 333 with the splicing resonant cells 320 that have such a diverging cross-sectional plane, such as the first acoustic core segment 350 as shown in FIG. 6A. Such an arrangement of the dovetail fasteners 333 and corresponding recesses 330 may allow for the dovetail fasteners 333 to fit at least partially within the respective resonant spaces 308 of the corresponding splicing resonant cells 320 and thereby intrinsically or inherently align the splicing resonant cells 320 of respective acoustic core segments 300. As the respective splicing resonant cells 320 come into alignment to form a splice joint 321, the one or more dovetail fasteners 333 may snap or otherwise fit into position within the corresponding recesses 330 so as to couple the respective splicing resonant cells 320 with one another to provide coupled resonant cells 329.

In some embodiments, coupled resonant cells 329 resulting from coupling splicing resonant cells 320 with a dovetail fastener 333 may include a coupled resonant space 331 substantially identical to the resonant space 308 of resonant cells 306 that are located elsewhere in one or more of the acoustic core segments joined by the splice joint 321, as shown, for example in FIG. 3C. While the coupled resonant cells 329 include a seam between the respective splicing resonant cells 320, the surface area and/or volume of the coupled resonant space 331 may otherwise correspond to the surface area and/or volume of the resonant space 308 of resonant cells 306 that are located elsewhere in one or more of the acoustic core segments joined by the splice joint 321. In some embodiments, the cell walls of the splicing resonant cells 320 may correspond in thickness to cell walls of resonant cells 306 that are located elsewhere in one or more of the acoustic core segments joined by the splice joint 321.

Figure 9A:
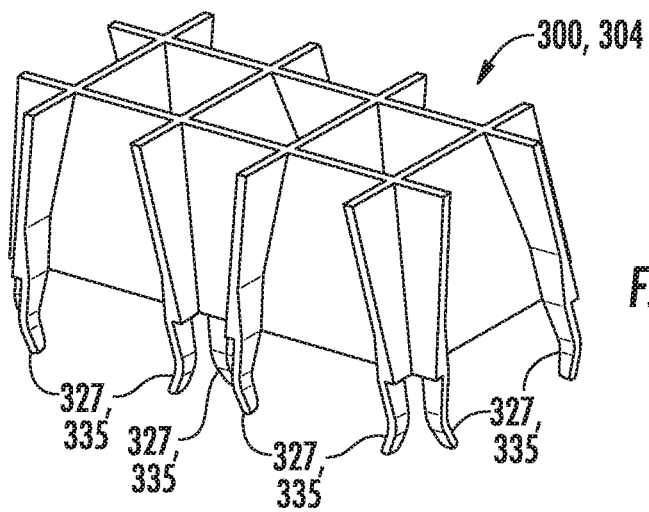
FIGS. 9A and 9B respectively show a perspective view and a side-view of another exemplary acoustic core segment.
Figure 9B:
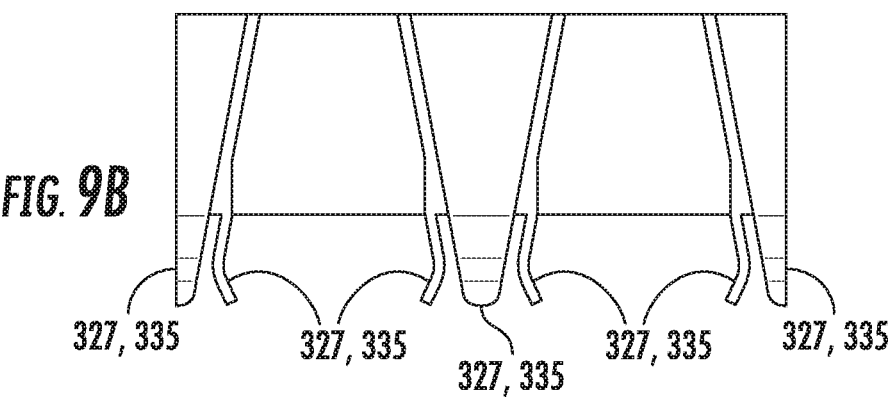
Figure 9C:
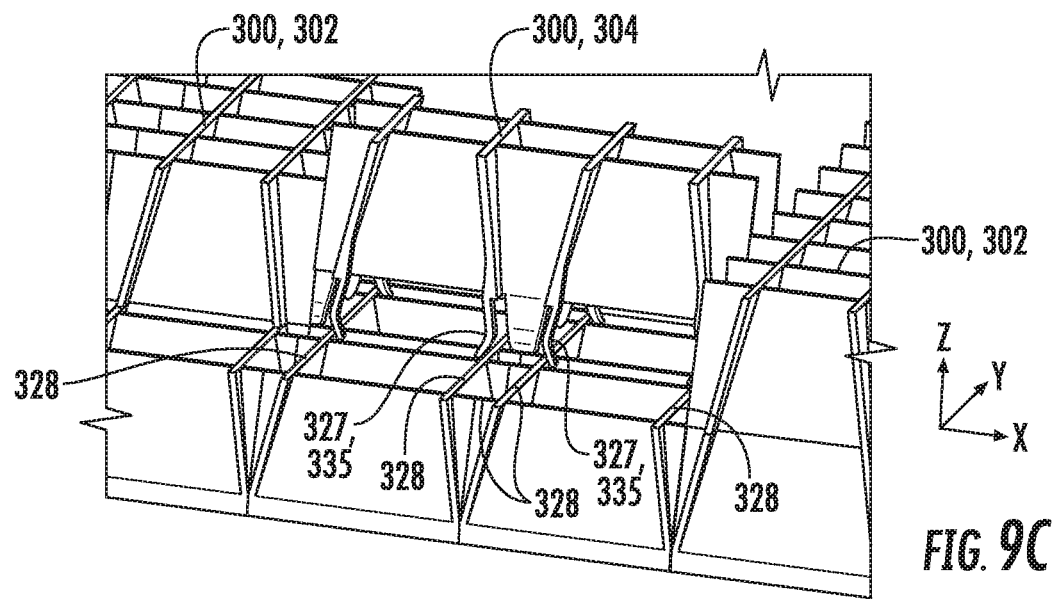
FIG. 9C shows a perspective view of another exemplary acoustic core segment configured to couple with the acoustic core segment of FIGS. 9A and 9B to provide another exemplary acoustic core assembly.

Now referring to FIGS. 9A-9C, in some embodiments a fastening element 327 may include a cantilever fastener 335. Acoustic core segments 300 that include cantilever fasteners 335 may be joined with one another using a combination of one or more splice joints 321 and one or more fastening elements 327 as described herein. It will be appreciated that the foregoing description with respect to acoustic core assemblies 200, acoustic core segments 300, fastening elements 327, etc. (including FIGS. 1 through 7 and the discussion thereof) apply to acoustic core segments 300 that include cantilever fasteners 335 except where the context precludes. For example, the presence of dovetail fasteners 333 in the previously discussed figures are provided by way of example only and are not meant to be limiting. Cantilever fasteners 335 may be included as an alternative or in addition to dovetail fasteners 333 or any other fastening element 327.

Figure 10A:
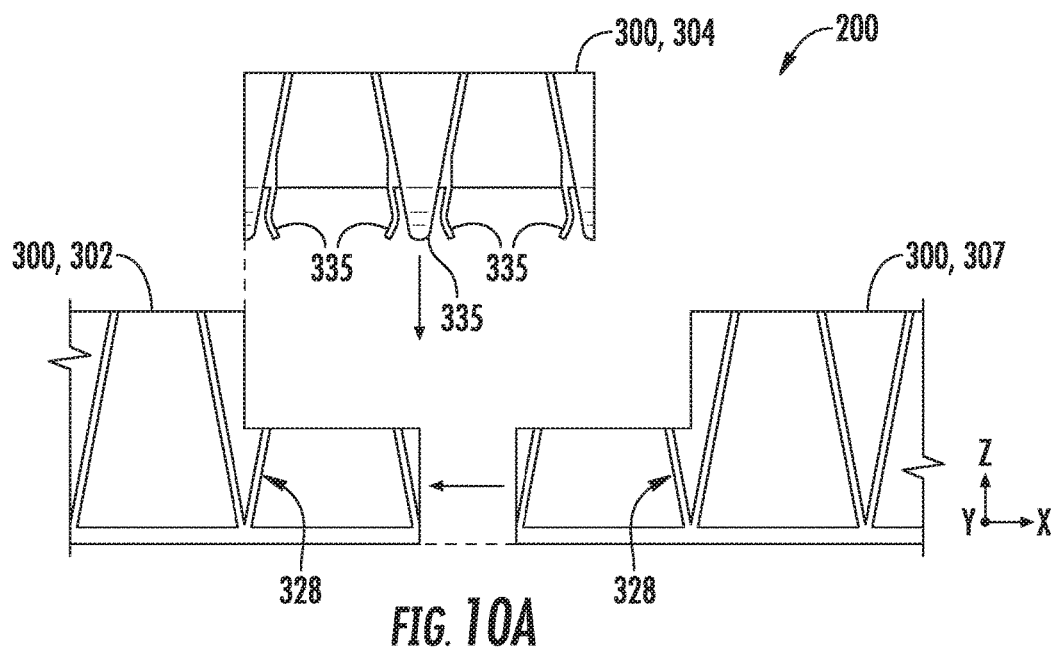
FIGS. 10A and 10B show the exemplary acoustic core segment of FIGS. 9A and 9B being coupled with the exemplary acoustic core segment of FIG. 9C with a combination of splice joints and fastening elements to provide another exemplary acoustic core assembly.
Figure 10B:
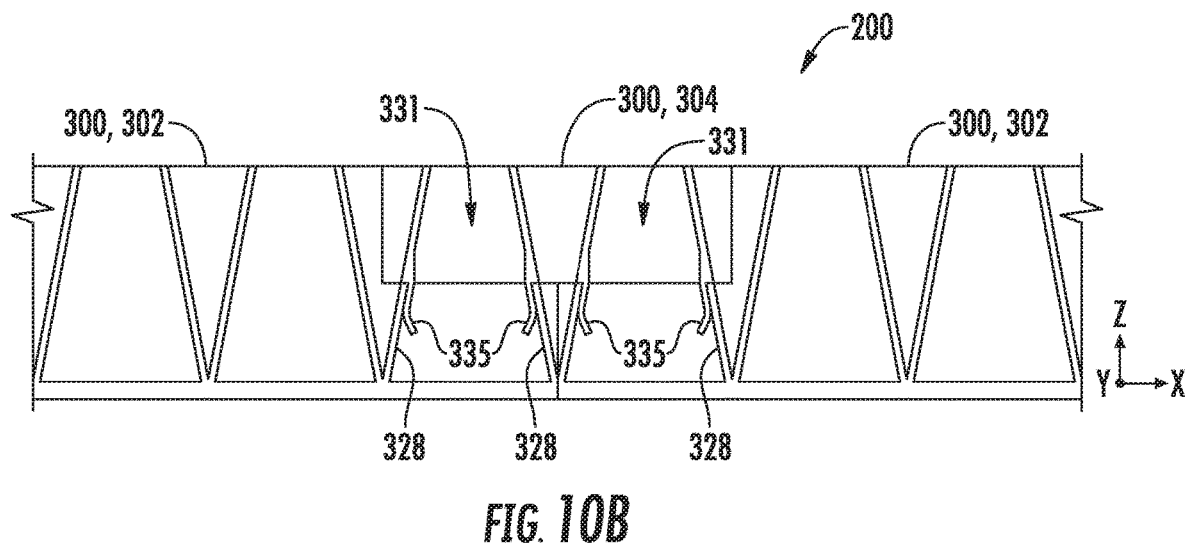
Figure 11A:
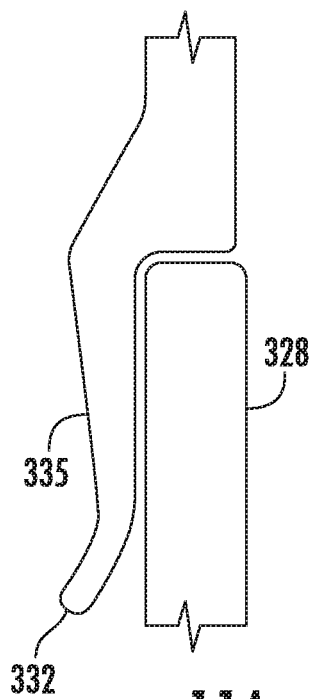
FIGS. 11A-11E show additional exemplary fastening elements that may be included in acoustic core segments couplable with one another to provide an acoustic core assembly.
Figure 11B:
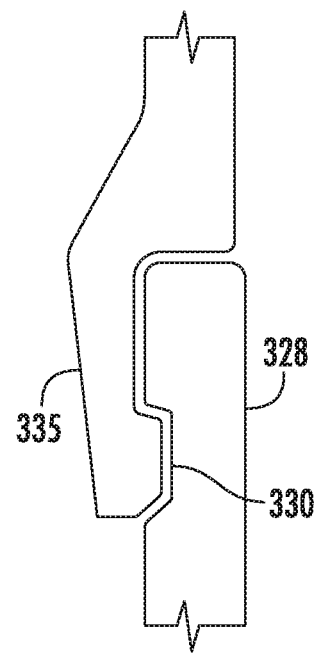
Figure 11C:
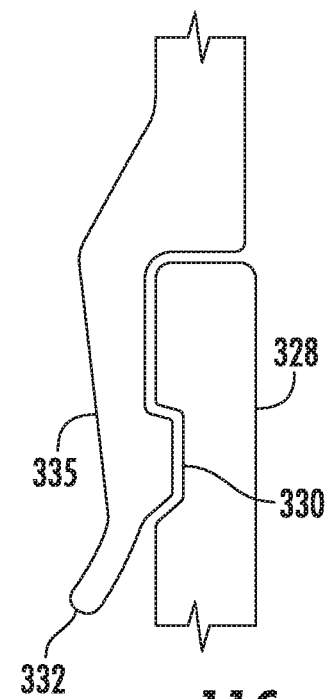
Figure 11D:
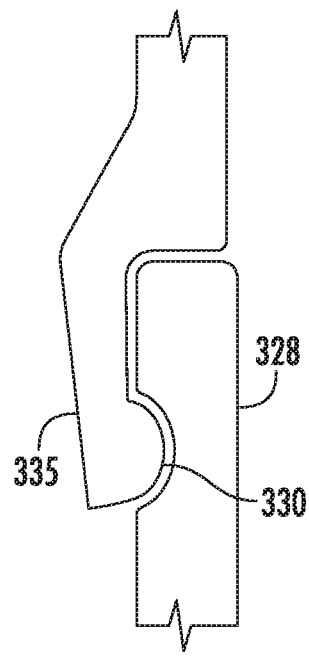
Figure 11E:
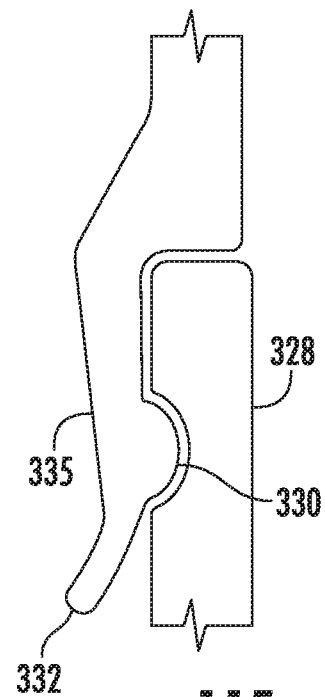

As shown, for example, in FIGS. 10A and 10B, one or more cantilever fasteners 335 may snap into position against one or more corresponding cell walls 328 configured to couple with the cantilever fasteners 335. Several exemplary cantilever fasteners 335 are shown in FIGS. 11A-11E. The cell walls 328 may be configured to couple with a fastening element, such as a cantilever fastener 335, without requiring any particular corresponding counterpart feature apart from the cell walls 328 themselves, such as shown in FIG. 11A. Rather the corresponding cell walls 328 themselves may serve as the corresponding counterpart feature to one or more fastening elements 327, such as cantilever fasteners 335. For example, the corresponding cell walls 328 may serve as the counterpart feature by receiving a cantilever force from the fastening elements 327. In some embodiments, however, cell walls 328 configured to couple with a fastening element 327 in the form of a cantilever fastener may include a recess 330 corresponding to the shape of the fastening element 327, such as shown in FIGS. 11B-11E. In some embodiments, a plurality of cantilever fasteners may intrinsically or inherently align with the corresponding cell walls 328, and thereby correspondingly align the respective splicing resonant cells 320. In some embodiments, a fastening element 327 such as a cantilever fastener may include an alignment flange 332, such as shown in FIGS. 11A, 11C, and 11E, to guide the intrinsic or inherent alignment of the fastening element 327.

The foregoing exemplary fastening elements 327 including dovetail fasteners 333 and cantilever fasteners 335 are provided by way of example and are not to be limiting. In fact, other exemplary fastening elements 327 will be within the contemplation of those skilled in the art in light of the present disclosure, all of which are within the spirit and scope of the present disclosure. Other exemplary fastening elements 327 include snap fasteners, tongue fasteners which couple with corresponding grooves, tenon fasteners which couple with corresponding mortices.

Figure 12:
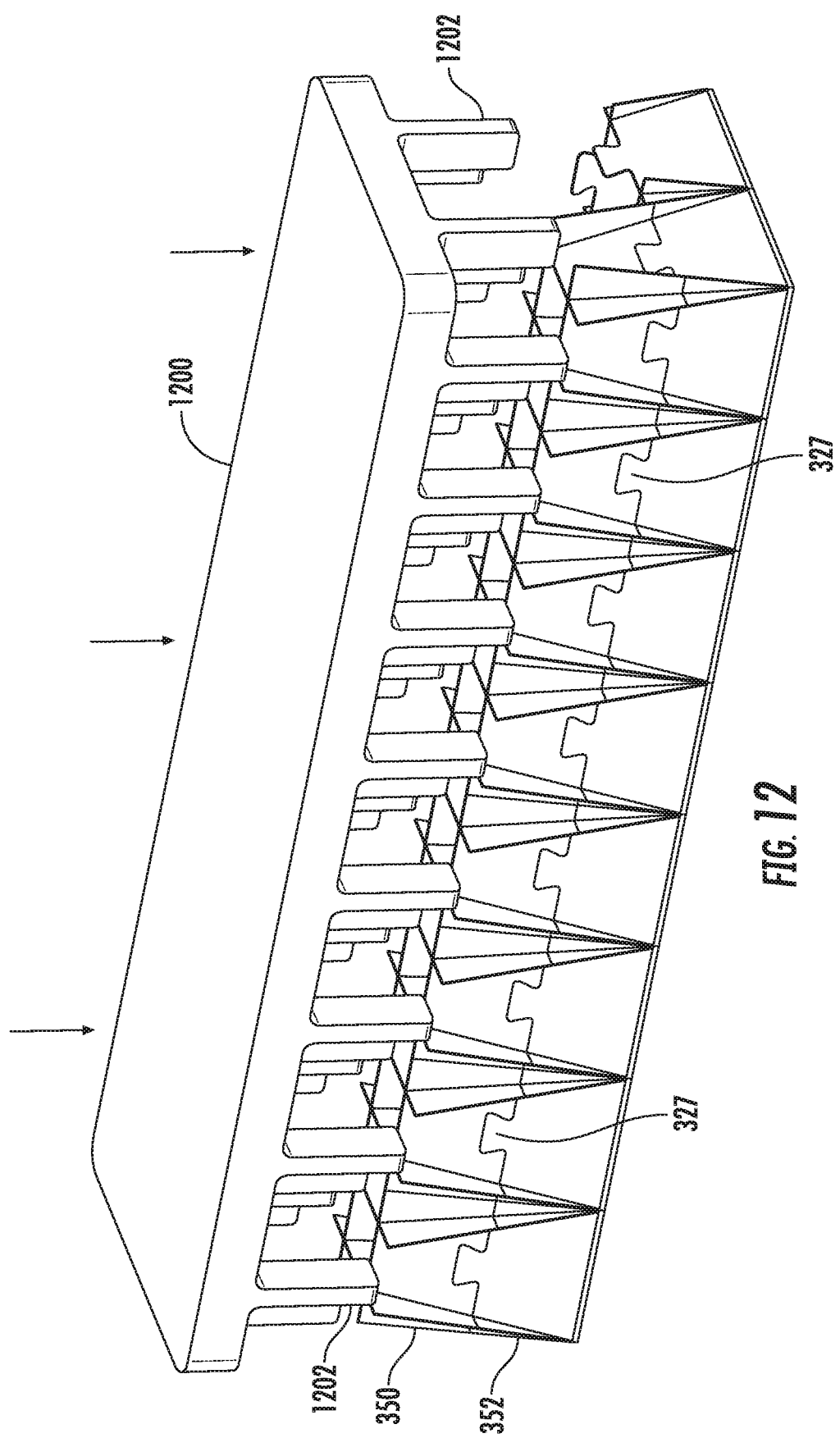
FIG. 12 shows an exemplary decoupling tool for separating acoustic core segments from one another.

In some embodiments, the acoustic core segments 300 described herein may be removably couplable. As shown in FIG. 12, a disassembly tool 1200 may be used to assist with separating acoustic core segments 300 from one another. The disassembly tool 1200 may include a plurality of prongs 1202 configured and arranged about the disassembly tool in a manner spatially corresponding to positions on an acoustic core segment 300 where fastening elements 327 are located. To disengage fastening elements 327 from corresponding recesses 330, the prongs 1202 may be positioned adjacent to the fastening elements 327 and then pressed against the fastening elements 327. Sufficient force may be applied to flex the fastening elements 327 enough to allow the fastening elements 327 to thereby disengage from the corresponding recesses 330.

The presently disclosed acoustic core segments 300 may include resonant cells 306 with any polyhedral configuration, including parallel polyhedral cellular structures and/or oblique polyhedral cellular structures. Parallel polyhedral cellular structures generally have geometric characteristics that resemble a right prism or a substantially right prism. A right prism is a polyhedron composed of an n-sided polygonal top face, a bottom face which is a translated copy of the top face without rotation, and n-number of rectangular lateral faces bisected by the top face and the bottom face. Given these characteristics of a right prism or substantially right prism, parallel polyhedral cellular structures have lateral faces that are substantially parallel to a normal line 201 represented by an axis R.

Figure 13:
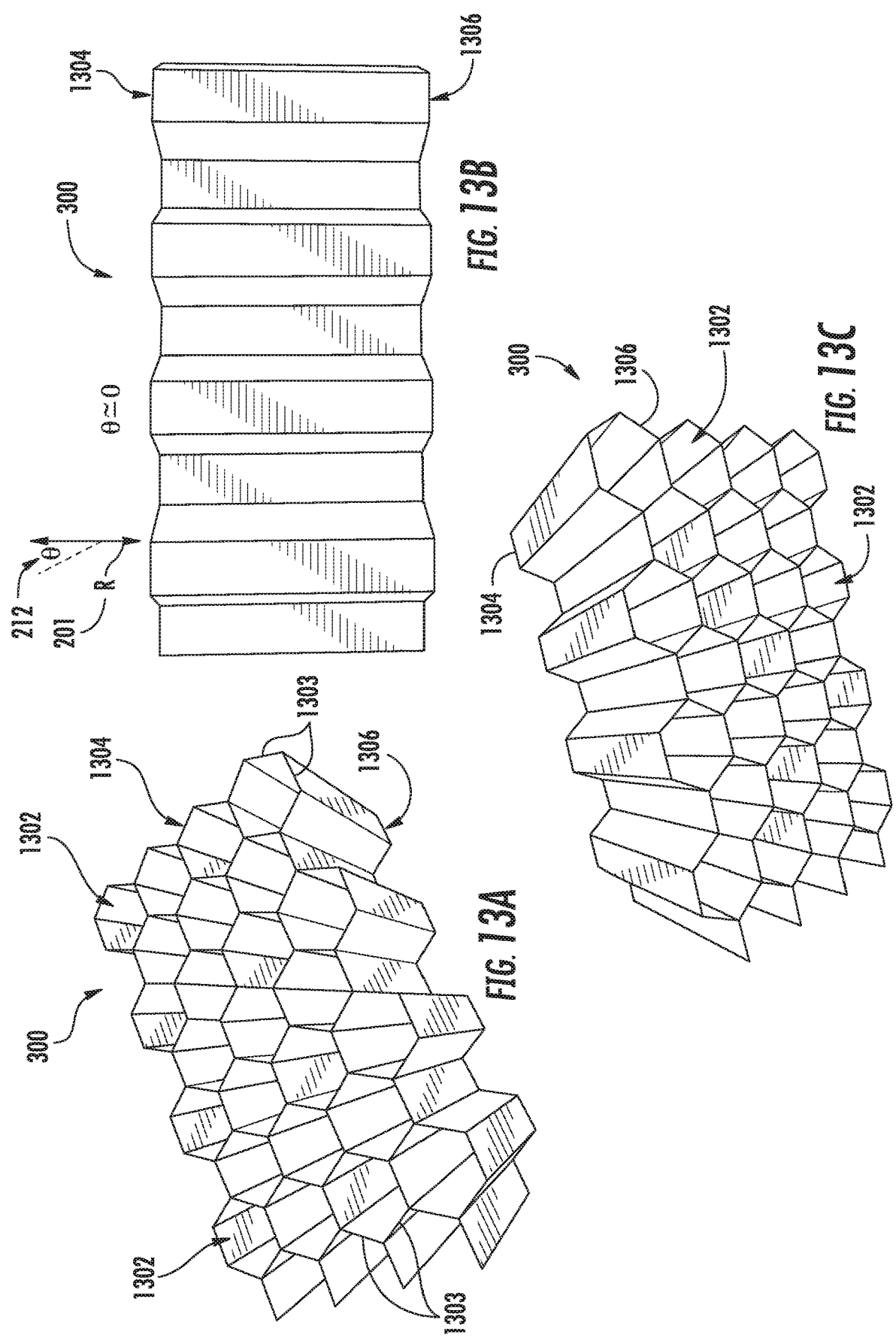
FIGS. 13A-13C respectively show a top perspective view, a side view, and a bottom perspective view of an acoustic core segment that has a parallel polyhedral cellular structure.

For example, FIGS. 13A-13C show an acoustic core segment 300 that has a parallel polyhedral cellular structure. As shown in FIGS. 13A-13C, an acoustic core segment 300 may have a plurality of polyhedral resonant cells 320, 1302 that exhibit geometric characteristics of a hexagonal prism or a "honeycomb" structure. The polyhedral resonant cells 1302 have a plurality of lateral polygonal faces 1303 bisected by a top face 1304 and a bottom face 1306. The top face 1304 and the bottom face 1306 are substantially parallel to one another and have substantially the same surface area as one another. The lateral faces 1303 are substantially parallel to the normal line 201 and have a convergence angle $\theta$ (theta) 212 of zero or approximately zero. Parallel polyhedral cellular structures, however, are not limited to those structures with identically sized lateral rectangular faces, nor are parallel polyhedral cellular structures limited to those structures with identical internal angles between adjacent lateral rectangular faces. Rather, parallel cellular structures include those structures with differently sized lateral rectangular faces and correspondingly differing internal angles between adjacent lateral rectangular faces. Such parallel cellular structures nevertheless have a top face 1304 and a bottom face 1306 with substantially the same surface area. Also, it will be appreciated that parallel cellular structures may not exhibit perfect symmetry due to minor imprecision in manufacturing technology and the like leading to imperfect symmetry in the cellular structures.

In contrast with parallel cellular structures, oblique polyhedral cellular structures have at least one lateral face that either converges or diverges relative to the normal line 201 represented by the axis R at a convergence angle $\theta$ (theta) 212 greater than zero degrees. A wide variety of convergence angles and/or divergence angles may be provided. For example, in various embodiments, a convergence angle $\theta$ (theta) 212 may fall within a range from greater than zero to 45 degrees, such as from 1 to 10 degrees, such as from 1 to 20 degrees, such as from 1 to 30 degrees, or such as from 1 to 45 degrees. In some embodiments, a convergence angle $\theta$ (theta) 212 may fall within a range from 2 to 30 degrees, such as from 2 to 10 degrees, such as from 5 to 15 degrees, such as from 10 to 20 degrees, or such as from 15 to 30 degrees. The convergence angle $\theta$ (theta) 212 may be greater than zero degrees, such as greater than 1 degrees, such as greater than 2 degrees, such as greater than 5 degrees, such as greater than 10 degrees, such as greater than 15 degrees, such as greater than 20 degrees, such as greater than 25 degrees, such as greater than 30 degrees, such as greater than 35 degrees, or such as greater than 40 degrees. The convergence angle $\theta$ (theta) 212 may be less than 45 degrees, such as less than 40 degrees, such as less than 35 degrees, such as less than 30 degrees, such as less than 25 degrees, such as less than 20 degrees, such as less than 15 degrees, such as less than 10 degrees, such as less than 5 degrees, or such as less than 1 degrees.

Figure 14:
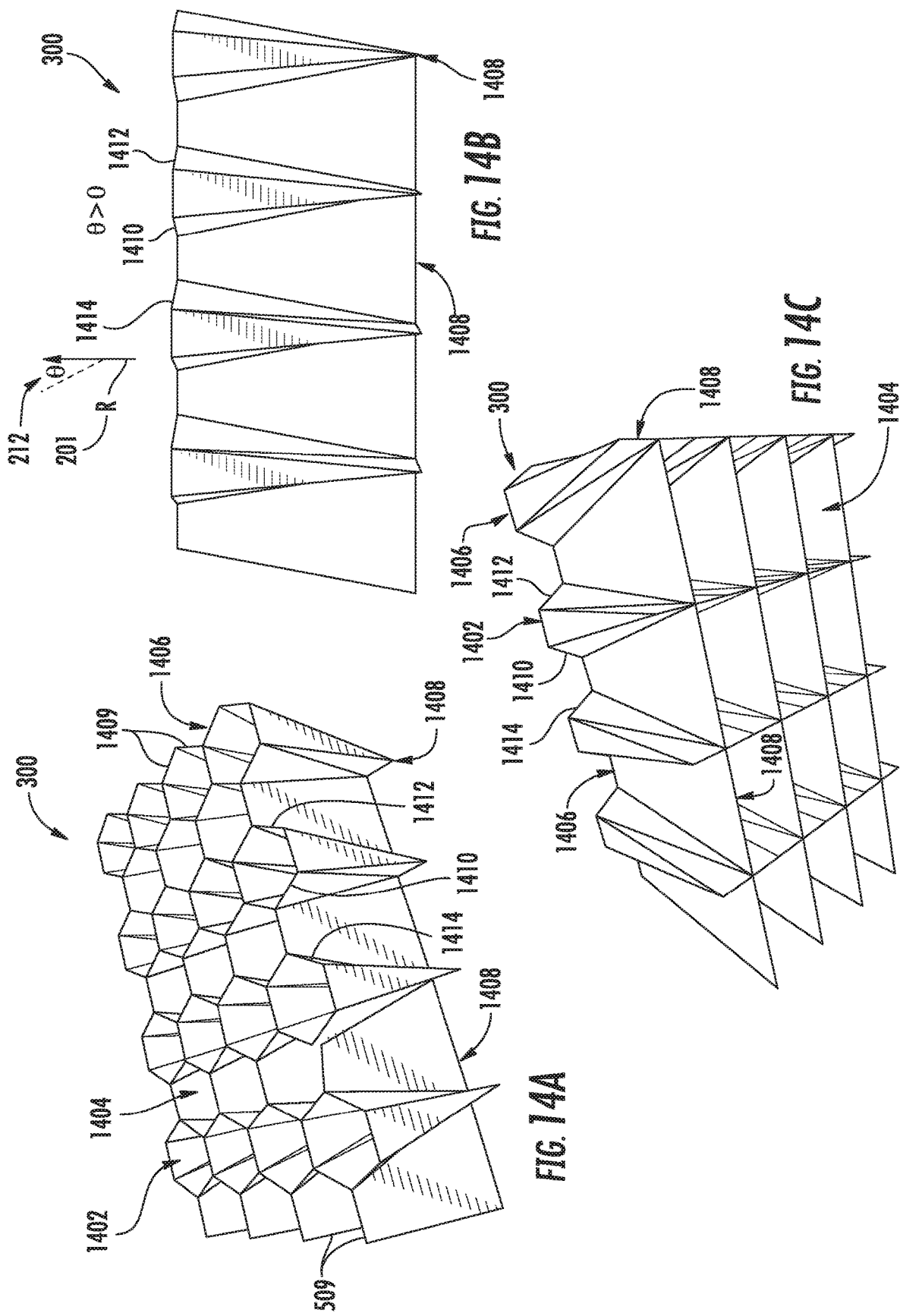
FIGS. 14A-14C respectively show a top perspective view, a side view, and a bottom perspective view of an acoustic core segment that has an oblique polyhedral cellular structure.

The exemplary acoustic core segments 300 shown in FIGS. 4A and 4B give one example of resonant cells 306, 320 with an oblique polyhedral cellular structure. FIGS. 14A-14C show another exemplary acoustic core segment 300 with resonant cells 306 that have an oblique polyhedral cellular structure 1400. As shown in FIGS. 14A-14C, an acoustic core segment 300 may have a plurality of oblique polyhedral resonant cells 320, 1400. The oblique polyhedral resonant cells 1400 may include a plurality of converging polyhedral resonant cells 1402 and a plurality of diverging polyhedral resonant cells 1404, bisected by a top face 1406 and a bottom face 1408. As shown, the top face 1406 and the bottom face 1408 are substantially parallel to one another. The converging polyhedral resonant cells 1402 or diverging polyhedral resonant cells 1404 have a plurality of lateral polygonal faces 1409. These lateral polygonal faces include at least a first lateral face 1410 that converges relative to the normal line 201 represented by the axis R at a convergence angle θ (theta) 212 greater than zero degrees. Additionally, or in the alternative, the lateral polygonal faces include at least a first lateral face 1410 that converges and/or relative to at least a second lateral face 1412. In some embodiments, the first lateral face 1410 may additionally or alternatively diverge relative to the normal line 201 and/or relative to at least a third lateral face 1414.

The converging polyhedral resonant cells 1402 and/or diverging polyhedral resonant cells 1404 have asymmetry in respect of at least one such converging or diverging lateral face and/or in respect of a differing cross-sectional area as between two substantially parallel planes that bisect the cell (i.e., the top face 1406 and the bottom face 1408). The substantially parallel planes 1406, 1408 may bisect an oblique polyhedral resonant cell 1400 as a plane, as a line, or as a point, depending on the configuration of the particular cell. As a convenience, such a plane, line, or point may sometimes be referred to more generally as a face. For example, the top face 1406 bisects both the converging resonant cells 1402 and the diverging resonant cells 1404 as a plane, and the bottom face 1408 bisects the converging resonant cells 1402 as a line and the diverging resonant cells 1404 as a plane.

Figure 15:
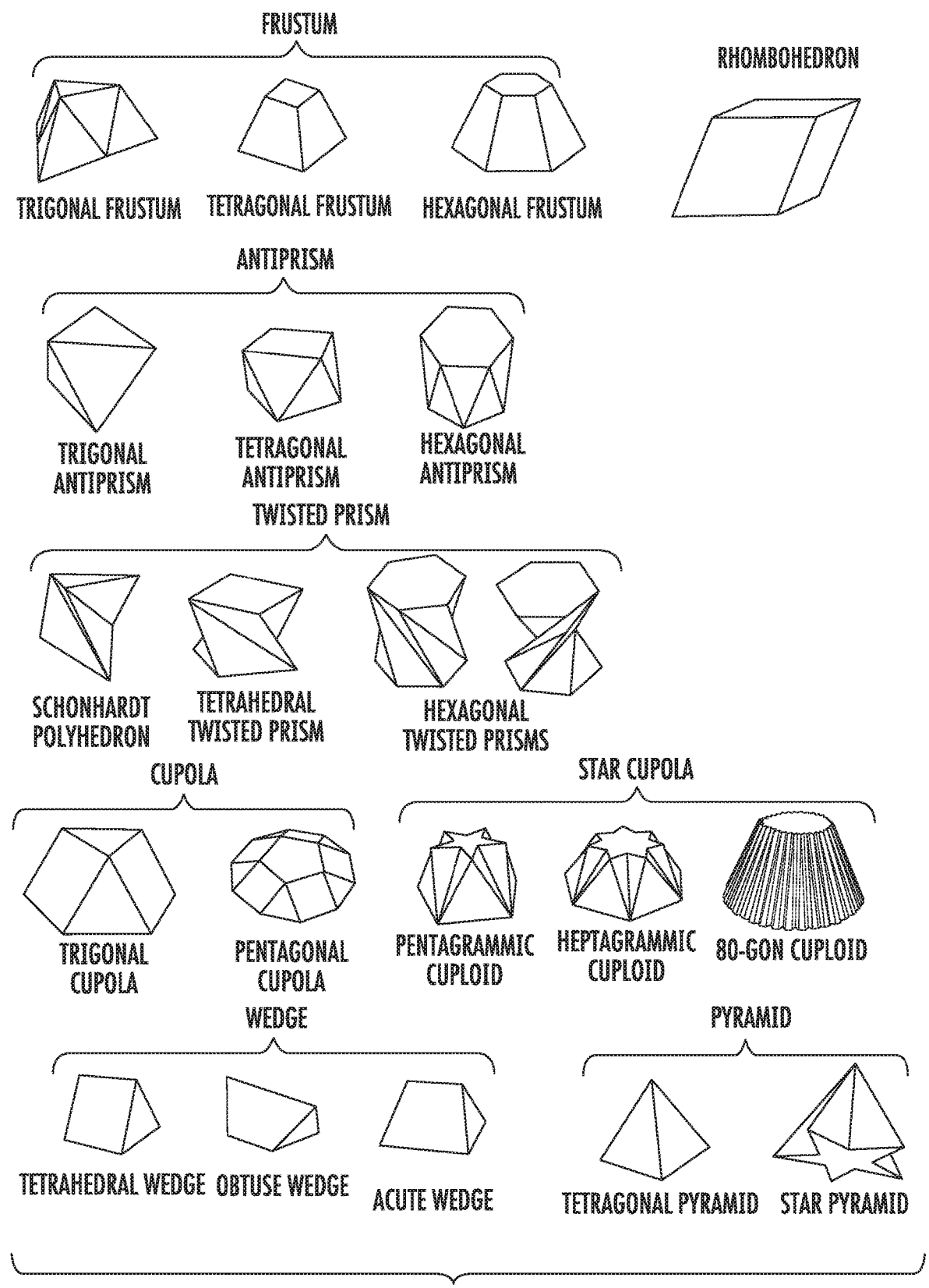
FIG. 15 shows several additional exemplary oblique polyhedral cells that may be included in an acoustic core segment.

In addition to the exemplary oblique polyhedral cellular structures shown in FIGS. 5A and 5B, and 14A-14C, an acoustic core segment 300 may include numerous other oblique polyhedral cellular structures. For example, FIG. 15 shows numerous exemplary oblique polyhedron that may be incorporated into an oblique polyhedral cellular structure in accordance with the present disclosure. Oblique polyhedral cellular structures may include all or a portion of any one or more of the oblique polyhedron shown in FIG. 15. Exemplary oblique polyhedral cellular structures may include a frustum, a rhombohedron, an antiprism, a twisted prism, a cupola (including a star cupola), a wedge, a pyramid, and combinations or portions of these. By way of example, a frustum may include a trigonal frustum, a tetragonal frustum, a pentagonal frustum, a hexagonal frustum, a heptagonal frustum, an octagonal frustum, a nonagonal frustum, a decagonal frustum, a hendecagonal frustum, a dodecagonal frustum, any other frustal polyhedron, and combinations of these. A frustal polyhedron includes a frustum combined with another polyhedron, including any of the aforementioned frustum shapes combined with another polyhedron. For example, a rhombohedron may be formed from any rhombus, providing a rhombal polyhedron. As a further example, a rhombohedron may be combined with a frustum to form a rhombohedral frustum.

An antiprism includes a polyhedron composed of a polygonal top face, a polygonal bottom face, and a sequence of adjacent trigonal lateral faces with alternating orientations, bisected by the top face and the bottom face. By way of example, an antiprism may include a trigonal antiprism, a tetragonal antiprism, a hexagonal antiprism, an antiprismal polyhedron, and combinations of these. An antiprismal polyhedron includes an antiprism combined with another polyhedron. In some embodiments, an antiprism may include an n-sided top face and an n-sided bottom face. Alternatively, an antiprism may include an n-sided top face and a bottom face with greater than or less than n-sided.

A twisted prism includes a polyhedron composed of a polygonal top face, a polygonal bottom face, and a plurality of lateral faces including at least some lateral faces bisected on a diagonal, with the top face and the bottom face twisted relative to one another, causing at least some adjacent lateral faces to be concave relative to one another. By way of example, a twisted prism may include a Schönhardt polyhedron, a tetrahedral twisted prism, a hexagonal twisted prism, a twisted prismal polyhedron, and combinations of these. A twisted prism has one or more lateral faces bisected on an adjacent diagonal or on a subsequent diagonal. For example, FIG. 15 shows a hexagonal twisted prism with lateral faces bisected on an adjacent diagonal, and a hexagonal twisted prism with lateral faces bisected on a second diagonal. A twisted prismal polyhedron includes a twisted prism combined with another polyhedron.

A cupola includes a polyhedron composed of a polygonal top face, a polygonal bottom face, and a plurality of lateral faces including an alternating sequence of trigonal lateral faces and tetragonal lateral faces. In some embodiments, a cupola has a top face with twice as many edges as that of its bottom face, or vice versa. By way of example, a cupola includes a trigonal cupola, which has a tetragonal top face and a hexagonal bottom face, or a hexagonal top face and a tetragonal bottom face; and a pentagonal cupola, which has a pentagonal top face and a decagonal bottom face, or vice versa. A cupola also includes star cupola, which is a cupola in which tetragonal lateral faces are replaced with adjacent concave trigonal lateral faces. Star cupola include a pentagrammic cupoid and a heptagrammic cupoid. A pentagrammic cupoid has a pentagonal bottom face and a pentagrammic top face, or vice versa. A heptagrammic cupoid has a heptagonal top face and a heptagrammic bottom face, or vice versa. As a further example, a cupola includes cupoidal configurations with numerous lateral faces, including configurations which approach frustoconical as the number of lateral faces increases. For example, a cupola includes an octacontagon, which has eighty lateral faces. A cupola also includes a cupoidal polyhedron, which includes a cupola or cupoid combined with another polyhedron.

A wedge includes a polyhedron with a polygonal top face and a plurality of polygonal lateral faces that converge into a line. By way of example, a wedge may include a tetrahedral wedge, an obtuse wedge, an acute wedge, and a wedged polyhedron, and combinations of these. A tetrahedral wedge has two trigonal lateral faces and two tetragonal lateral faces. The lateral faces are bisected by a tetragonal plane on one side and converge into a line on the other. An obtuse wedge converges into a line that is wider than the opposing tetragonal plane. An acute wedge converges into a line that is narrower than the opposing tetragonal plane. A wedged polyhedron includes a wedge combined with another polyhedron.

A pyramid includes a polyhedron with a polygonal base bisected by a plurality of trigonal lateral faces that converge into a point. By way of example, a pyramid includes a tetragonal pyramid composed of a tetragonal face bisected by four trigonal lateral faces which converge into a point. A pyramid also includes a star pyramid, composed of a star polygonal base and a plurality of trigonal lateral faces that converge into a point. As an example, a star pyramid includes a pentagonal star pyramid.

Any one or more of these oblique polyhedral configurations (including combinations or portions thereof) may be included in various exemplary oblique cellular structures. In one aspect, the converging polyhedral resonant cells 1402 shown in FIGS. 14A-14C resemble aspects of an antiprism combined with aspects of a wedge. For example, the converging polyhedral resonant cells 1402 include a polygonal (hexagonal) top face 1406, and similar to an antiprism, a plurality of trigonal lateral faces bisected by a bottom face 1408. Similar to a wedge, the bottom face 1408 has the form of a line. In another aspect, the converging polyhedral resonant cells 1402 resemble aspects of a "flipped antiprism," that is, an antiprism that has been twisted 180-degrees about its vertical axis. The converging polyhedral resonant cells 1402 have been flipped or twisted at their midpoints 1403. The diverging polyhedral resonant cells 1404 resemble aspects of an antiprism combined with aspects of a frustum and/or a cupola. For example, the diverging polyhedral resonant cells 1404 include a polygonal (hexagonal) top face 1406, bisected by a plurality of lateral faces, which similar to an antiprism have a plurality of adjacent trigonal lateral faces, but also with an alternating sequence of trigonal lateral faces and tetragonal lateral faces similar to a cupola.

Figure 16:
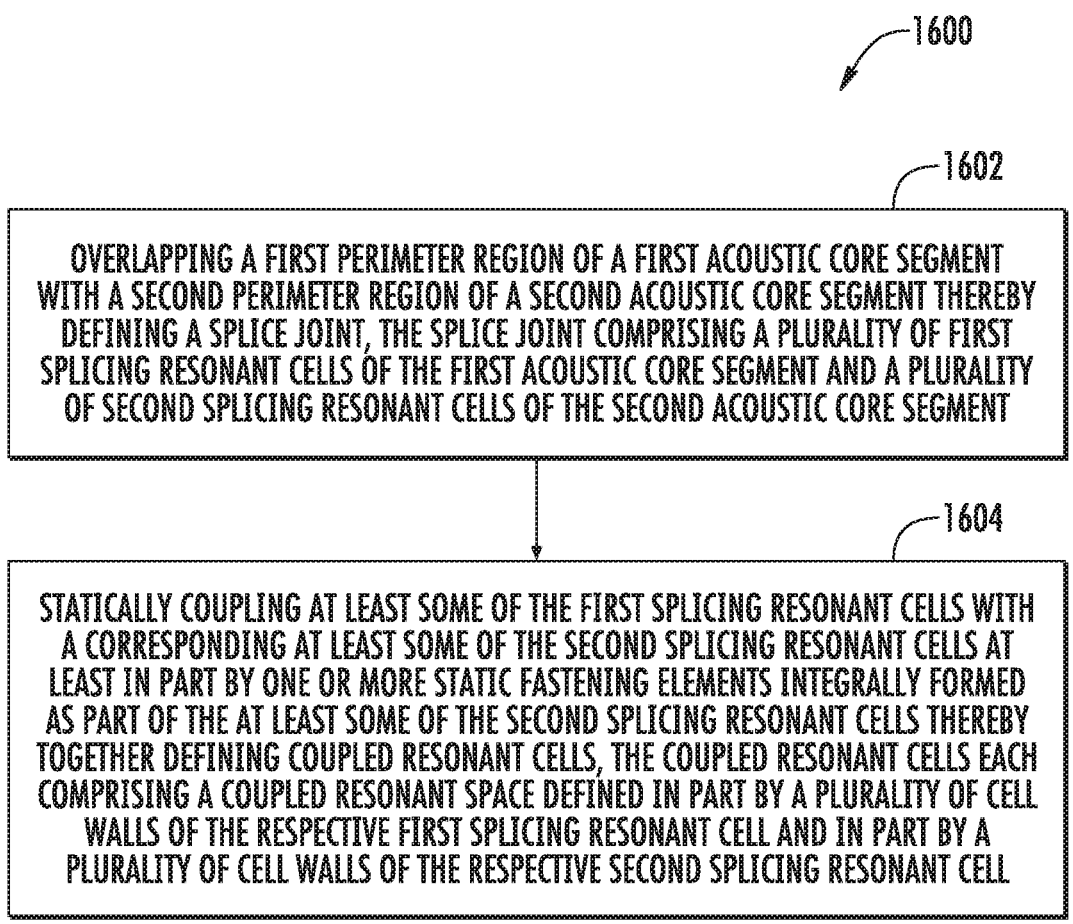
FIG. 16 shows a flowchart illustrating an exemplary method of mechanically joining acoustic core segments to provide an acoustic core assembly.

Now referring to FIG. 16, an exemplary method 1600 of method of mechanically joining acoustic core segments 300 will be discussed. An exemplary method 1600 includes overlapping a first perimeter region of a first acoustic core segment with a second perimeter region of a second acoustic core segment thereby defining a splice joint 1602. An exemplary method 1600 additionally includes coupling at least some of the first splicing resonant cells with a corresponding at least some of the second splicing resonant cells at least in part by one or more fastening elements 327 integrally formed as part of the at least some of the first splicing resonant cells and/or as part of the at least some of the second splicing resonant cells thereby together defining coupled resonant cells 1604. The splice joint 321 may include a plurality of first splicing resonant cells 320 of the first acoustic core segment 350 and a plurality of second splicing resonant cells 320 of the second acoustic core segment 350. The coupled resonant cells 329 may include a coupled resonant space 331 defined in part by a plurality of cell walls of the respective first splicing resonant cell 320 and in part by a plurality of cell walls of the respective second splicing resonant cell 320.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An acoustic core segment, comprising:
    an array of resonant cells, the resonant cells comprising a plurality of cell walls and a resonant space defined by the plurality of cell walls, a portion of the resonant cells located along at least one perimeter region of the acoustic core segment being splicing resonant cells;
    wherein the splicing resonant cells resemble a first segment of a whole resonant cell configured to overlap and align with counterpart splicing resonant cells of another acoustic core segment so as to define a splice joint, the counterpart splicing resonant cells resembling a second segment of a whole resonant cell corresponding in counterpart to the first segment so as to together resemble a whole resonant cell; and
    wherein at least some of the splicing resonant cells comprise one or more fastening elements configured to couple with a corresponding at least some of the counterpart splicing resonant cells thereby together defining coupled resonant cells comprising a coupled resonant space defined in part by the plurality of cell walls of the respective splicing resonant cell and in part by a plurality of cell walls of the respective corresponding counterpart splicing resonant cell.

2. The acoustic core segment of claim 1, wherein the acoustic core segment comprises a panel segment, and wherein the panel segment is mechanically joined with another acoustic core segment by a combination of the splice joint and the one or more fastening elements.

3. The acoustic core segment of claim 1, wherein the acoustic core segment comprises a splice segment, and wherein the splice segment is mechanically joined with another acoustic core segment by a combination of the splice joint and the one or more fastening elements.

4. The acoustic core segment of claim 1, wherein the splicing resonant cells are overlapped and aligned with counterpart splicing resonant cells of another acoustic core segment comprising a panel segment or a splice segment.

5. The acoustic core segment of claim 1, wherein the splicing resonant cells have a height that corresponds to from 10% to 90% the height of a whole resonant cell.

6. The acoustic core segment of claim 5, wherein the splicing resonant cells and the counterpart splicing resonant cells have a combined height when coupled together that corresponds to from 99% to 101% of the height of a whole resonant cell.

7. The acoustic core segment of claim 1, wherein the splicing resonant cells have a height that corresponds to about 50% of the height of a whole resonant cell.

8. The acoustic core segment of claim 1, wherein the splice joint comprises a half-lap splice, a bevel-lap splice, a scarf splice, a tabled splice, and/or a wedged table splice.

9. The acoustic core segment of claim 1, wherein the fastening element comprises a dovetail fastener and/or a cantilever fastener.

10. The acoustic core segment of claim 9, wherein the splicing resonant cells and/or the counterpart splicing resonant cells have one or more cell walls comprising a recess corresponding to the shape of the fastening element.

11. The acoustic core segment of claim 9, wherein the dovetail fastener comprises a wedged dovetail fastener, a key dovetail fastener, a wave dovetail fastener, a lollipop dovetail fastener, a hexagonal dovetail fastener, an arrowhead dovetail fastener, a heart dovetail fastener, and/or a dog-bone dovetail fastener.

12. The acoustic core segment of claim 1, wherein the at least one perimeter region comprises from 1 to 200 rows of splicing resonant cells.

13. The acoustic core segment of claim 1, wherein the coupled resonant space comprises a surface area and/or a volume that correspond to the surface area and/or volume of the resonant space of resonant cells located elsewhere in the acoustic core segment.

14. The acoustic core segment of claim 1, wherein the acoustic core segment comprises an oblique polyhedral cellular structure.

15. The acoustic core segment of claim 1, wherein at least some of the splicing resonant cells comprise one or more cell walls which serve as a corresponding counterpart feature to the one or more fastening elements.

16. A turbomachine comprising:
a turbine; and
a nacelle surrounding the turbine, the nacelle defining a fan duct having a duct inner wall; and
one or more acoustic liners disposed annularly along the duct inner wall, at least one of the one or more acoustic liners having an acoustic core assembly comprising a first acoustic core segment mechanically joined with a second acoustic core segment by a combination of splicing resonant cells of the first acoustic core segment overlapping and aligning with splicing resonant cells of the second acoustic core segment so as to define a splice joint, and a plurality of fastening elements integrally formed as part of the first acoustic core segment and/or the second acoustic segment, the fastening elements coupling splicing resonant cells of the first acoustic core segment with splicing resonant cells of the second acoustic core segment.

17. The turbomachine engine of claim 16, wherein the splicing resonant cells of the first acoustic core segment resemble a first segment of a whole resonant cell and the splicing resonant cells of the second acoustic core segment resemble a second segment of a whole resonant cell corresponding in counterpart to the first segment so as to together resemble a whole resonant cell.

18. The turbomachine engine of claim 17, wherein the splicing resonant cells of the first acoustic core segment and the splicing resonant cells of the second acoustic core segment together define coupled resonant cells, the coupled resonant cells comprising a coupled resonant space defined in part by a plurality of cell walls of the respective first splicing resonant cell and in part by a plurality of cell walls of the respective second splicing resonant cell.

19. The turbomachine engine of claim 16, wherein the one or more acoustic liners comprises an arcuate or cylindrical acoustic liner and/or a complexly curved acoustic liner.

20. A method of mechanically joining acoustic core segments, the method comprising:
overlapping a first perimeter region of a first acoustic core segment with a second perimeter region of a second acoustic core segment thereby defining a splice joint, the splice joint comprising a plurality of first splicing resonant cells of the first acoustic core segment and a plurality of second splicing resonant cells of the second acoustic core segment; and
statically coupling at least some of the first splicing resonant cells with a corresponding at least some of the second splicing resonant cells at least in part by one or more fastening elements integrally formed as part of the at least some of the first splicing resonant cells and/or as part of the at least some of the second splicing resonant cells thereby together defining coupled resonant cells, the coupled resonant cells comprising a coupled resonant space defined in part by a plurality of cell walls of the respective first splicing resonant cell and in part by a plurality of cell walls of the respective second splicing resonant cell.

* * * * *